(12) United States Patent  
Cho et al.

(10) Patent No.: US 9,086,755 B2  
(45) Date of Patent: Jul. 21, 2015

(54) MOBILE TERMINAL AND METHOD OF CONTROLLING THE MOBILE TERMINAL

(75) Inventors: Seon Hwi Cho, Seoul (KR); Jong Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 583 days.

(21) Appl. No.: 12/485,877

(22) Filed: Jun. 16, 2009

(65) Prior Publication Data

US 2009/0322695 A1   Dec. 31, 2009

(30) Foreign Application Priority Data

Jun. 25, 2008 (KR) ........................ 10-2008-0060360

(51) Int. Cl.  
*G06F 3/041* (2006.01)  
*G06F 3/0488* (2013.01)

(52) U.S. Cl.  
CPC ............ *G06F 3/0416* (2013.01); *G06F 3/0488* (2013.01); *G06F 2203/014* (2013.01)

(58) Field of Classification Search  
CPC ..... G06F 3/016; G06F 3/04883; G06F 3/041; A61M 2205/581  
USPC .......................................................... 345/173  
See application file for complete search history.

(56) References Cited

U.S. PATENT DOCUMENTS

| | | | | |
|---|---|---|---|---|
| 5,298,883 A * | 3/1994 | Pilney et al. | ............... | 340/573.2 |
| 6,963,762 B2 * | 11/2005 | Kaaresoja et al. | ............ | 455/567 |
| 7,109,967 B2 * | 9/2006 | Hioki et al. | .................... | 345/104 |
| 7,199,786 B2 * | 4/2007 | Suraqui | ........................ | 345/168 |
| 2003/0227441 A1 * | 12/2003 | Hioki et al. | .................... | 345/156 |
| 2004/0021643 A1 * | 2/2004 | Hoshino et al. | ............... | 345/173 |
| 2004/0204000 A1 * | 10/2004 | Dietrich et al. | ............ | 455/550.1 |
| 2006/0046843 A1 * | 3/2006 | Nakajima | ........................ | 463/30 |
| 2006/0062149 A1 * | 3/2006 | Bednasz | ........................ | 370/235 |
| 2007/0254722 A1 * | 11/2007 | Kim et al. | ...................... | 455/566 |
| 2008/0024459 A1 * | 1/2008 | Poupyrev et al. | ............. | 345/173 |
| 2008/0098331 A1 | 4/2008 | Novick et al. | | |

(Continued)

FOREIGN PATENT DOCUMENTS

| | | |
|---|---|---|
| JP | 2008-033739 | 2/2008 |
| KR | 10-2007-0039113 | 4/2007 |

(Continued)

OTHER PUBLICATIONS

Korean Intellectual Property Office Application Serial No. 10-2008-0060360, Office Action dated Jun. 16, 2014, 5 pages.

*Primary Examiner* — Andrew Sasinowski  
*Assistant Examiner* — Mihir Rayan  
(74) *Attorney, Agent, or Firm* — Lee, Hong, Degerman, Kang & Waimey

(57) ABSTRACT

Provided are a mobile terminal and a method of controlling the mobile terminal in which various operations performed by the mobile terminal can be controlled based on a vibration-indicator image representing the intensity, pattern and frequency of vibration generated by the mobile terminal. Therefore, it is possible for a user to identify the vibration generated by the mobile terminal not only with his or her sense of touch but also with his or her sense of touch. In addition, it is possible to display a vibration-indicator image representing vibration generated upon the detection of an entity near and approaching the mobile terminal and change the vibration-indicator image according to the distance between the entity and the mobile terminal. Thus, it is possible to easily determine the state of the entity.

34 Claims, 18 Drawing Sheets

(56) References Cited

U.S. PATENT DOCUMENTS

| | | | |
|---|---|---|---|
| 2008/0168290 A1* | 7/2008 | Jobs et al. | 713/324 |
| 2008/0188268 A1* | 8/2008 | Kim et al. | 455/566 |
| 2008/0204427 A1* | 8/2008 | Heesemans et al. | 345/174 |
| 2008/0295015 A1* | 11/2008 | Liu et al. | 715/772 |
| 2009/0102805 A1* | 4/2009 | Meijer et al. | 345/173 |
| 2009/0106655 A1* | 4/2009 | Grant et al. | 715/702 |
| 2009/0167694 A1* | 7/2009 | Tan et al. | 345/168 |
| 2009/0167704 A1* | 7/2009 | Terlizzi et al. | 345/173 |
| 2009/0167715 A1* | 7/2009 | Wang et al. | 345/173 |
| 2009/0284532 A1* | 11/2009 | Kerr et al. | 345/442 |

FOREIGN PATENT DOCUMENTS

| | | |
|---|---|---|
| KR | 10-2007-0039613 | 4/2007 |
| KR | 10-2008-0049696 | 6/2008 |

* cited by examiner

MOBILE TERMINAL AND METHOD OF CONTROLLING THE MOBILE TERMINAL

CROSS-REFERENCE TO RELATED APPLICATION

This application claims the priority benefit of Korean Patent Application No. 10-2008-0060360, filed on Jun. 25, 2008, respectively, in the Korean Intellectual Property Office, the disclosure of which is incorporated herein by reference.

BACKGROUND OF THE INVENTION

1. Field of the Invention

The present invention relates to a mobile terminal and a method of controlling the mobile terminal in which the operation of the mobile terminal can be controlled in various manners by visualizing various information regarding vibration generated by the mobile terminal such as the intensity, pattern and frequency of the vibration.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

However, there is a restriction in allocating sufficient space for a UI (such as a display device or a keypad) of a mobile terminal without compromising the mobility and the portability of a mobile terminal. The size of mobile terminals may be insufficient to properly perform data input and output functions even if they are equipped with full-touch screens. Therefore, it is necessary to develop ways to control the operation of a mobile terminal using a new data input/output method, instead of navigating through a complicated menu structure, and thus efficiently use various functions provided by the mobile terminal.

SUMMARY OF THE INVENTION

The present invention provides a mobile terminal and a method of controlling the mobile terminal in which various changes can be made to a screen displayed by the mobile terminal according to information regarding vibration generated by a vibration module such as the intensity, pattern, place of occurrence, moving direction and moving speed of the vibration and the information regarding the vibration can be visualized.

According to an aspect of the present invention, there is provided a method of controlling a mobile terminal equipped with a vibration module generating vibration, the method including generating a vibration signal for driving the vibration module to generate vibration; and changing a screen displayed on a display module according to at least one of the intensity, pattern, place of occurrence, moving direction and moving speed of vibration generated in response to the vibration signal by the vibration module.

According to another aspect of the present invention, there is a mobile terminal including a vibration module configured to generate vibration; a display module configured to display a screen; and a controller configured to generate a vibration signal for driving the vibration module to generate vibration and change the screen according to at least one of the intensity, pattern, place of occurrence, moving direction and moving speed of vibration generated in response to the vibration signal by the vibration module.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
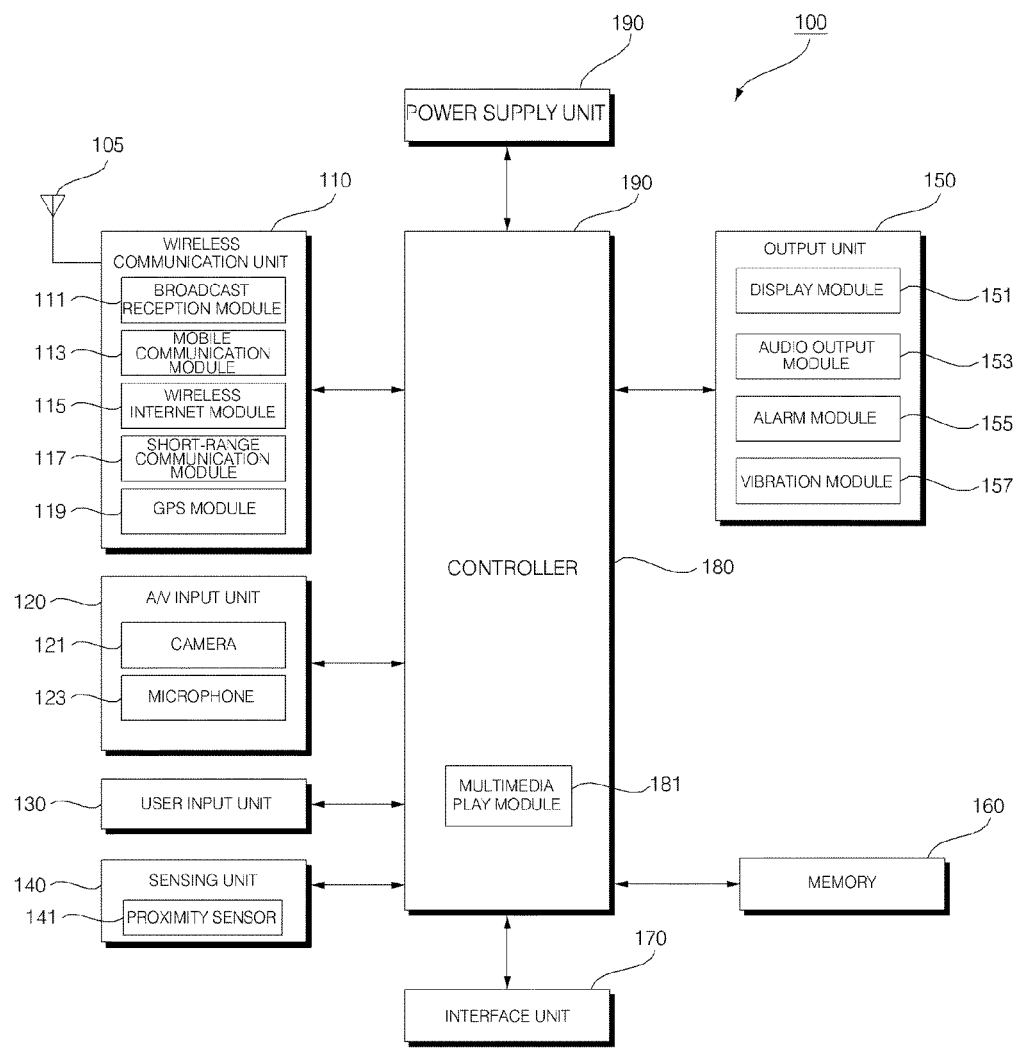
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless internet module 115 may be a module for wirelessly accessing the internet. The wireless internet module 115 may be embedded in the mobile terminal 100 or may be installed in an external device. The wireless internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141. The proximity sensor 141 may determine whether there is an entity nearby and approaching the mobile terminal 100 without any mechanical contact with the entity. More specifically, the proximity sensor 141 may detect an entity that is nearby and approaching by detecting a change in an alternating magnetic field or the rate of change of static capacitance. The sensing unit 140 may include two or more proximity sensors 141.

The output unit 150 may output audio signals, video signals and alarm signals. The output unit 150 may include the display module 151, an audio output module 153, an alarm module 155, and a vibration module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is detected, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a haptic-effect signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The vibration module 157 may be controlled by a vibration signal provided by the controller 180. More specifically, the intensity or pattern of vibration generated by the vibration module 157 may be determined by the vibration signal. The mobile terminal 100 may be equipped with two or more vibration modules 157. In this case, vibrations respectively generated by the vibration modules 157 may be different from one another in terms of the place of occurrence, the moving direction and the moving speed. The place of occurrence, the moving direction and the moving speed of vibration may be determined by the vibration signal.

The vibration module 157 may generate various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The vibration module 157 may be configured to enable the user to recognize a haptic effect using the kinesthetic sense of the fingers or the arms.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The mobile terminal 100 may include a wired/wireless communication system and a satellite-based communication system. The mobile terminal 100 may be configured to be able to operate in a communication system transmitting data as frames or packets.

The exterior of the mobile terminal 100 will hereinafter be described in detail with reference to FIGS. 2 and 3. For convenience, assume that the mobile terminal 100 is a bar-type mobile terminal equipped with a full-touch screen. However, the present invention is not restricted to a bar-type mobile terminal. Rather, the present invention can be applied to various mobile phones, other than a bar-type mobile terminal.

Figure 2:
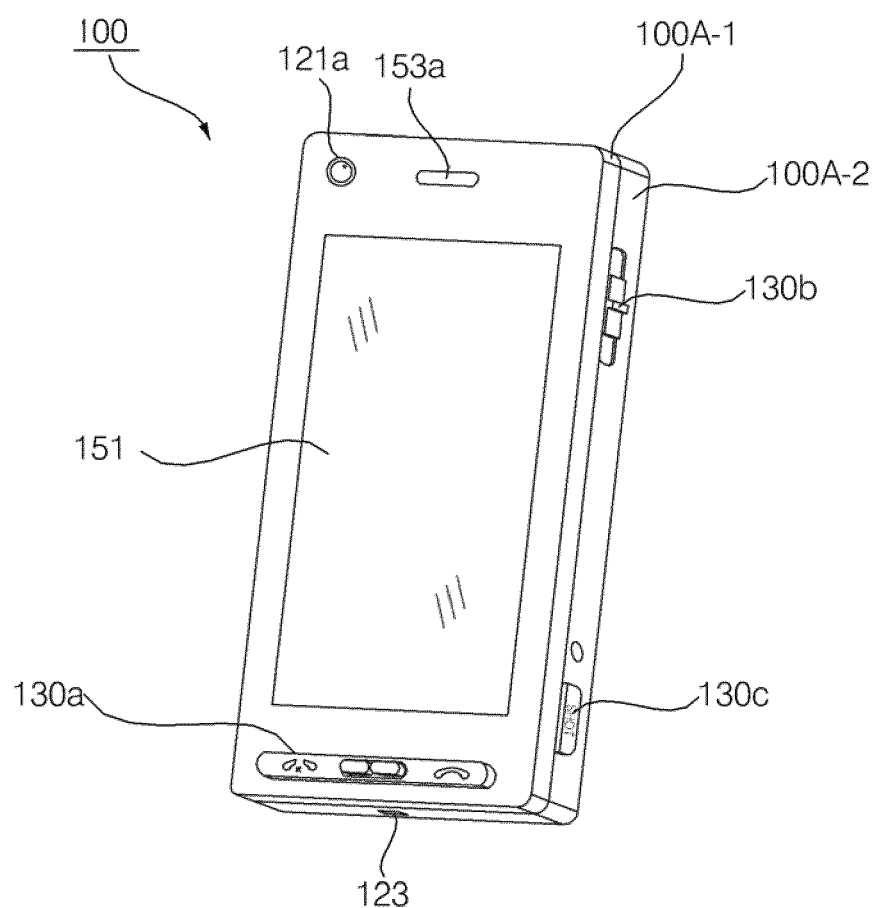
FIG. 2 illustrates a front perspective view of the mobile terminal shown in FIG. 1.

FIG. 2 illustrates a front perspective view of the mobile terminal 100 shown in FIG. 1. Referring to FIG. 2, the exterior of the first body 100A may be defined by a front case 100A-1 and a rear case 100A-2. Various electronic devices may be installed in the space formed by the front case 100A-1 and the rear case 100A-2. At least one intermediate case may be additionally provided between the front case 100A-1 and the rear case 100A-2. The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

The display module 151, a first audio output module 153a, a first camera 121a and a first user input unit 130a may be disposed in the front case 100A-1. A second user input unit 130b, a third user input unit 130c and the microphone 123 may be disposed on one side of the rear case 100A-2.

Examples of the display module 151 include an LCD and an OLED which can visualize information. Since a touch pad is configured to overlap the display module 151 and thus to form a layer structure, the display module 151 may serve as a touch screen. Thus, it is possible for the user to input various information to the mobile terminal 100 simply by touching the display module 151.

The first audio output module 153a may be implemented as a receiver or a speaker. The first camera 121a may be configured to capture a still image or a moving image of the user. The microphone 123 may be configured to properly receive the user's voice or other sounds.

The first through third user input units 130a through 130c may be collectively referred to as the user input unit 130. The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick.

The first user input unit 130a may allow the user to input commands (such as 'start', 'end', and 'send'), the second user input unit 130b may be used to switch from one operating mode to another, and the third user input unit 130c may be used as a hot key for activating certain functions of the mobile terminal 100.

Figure 3:
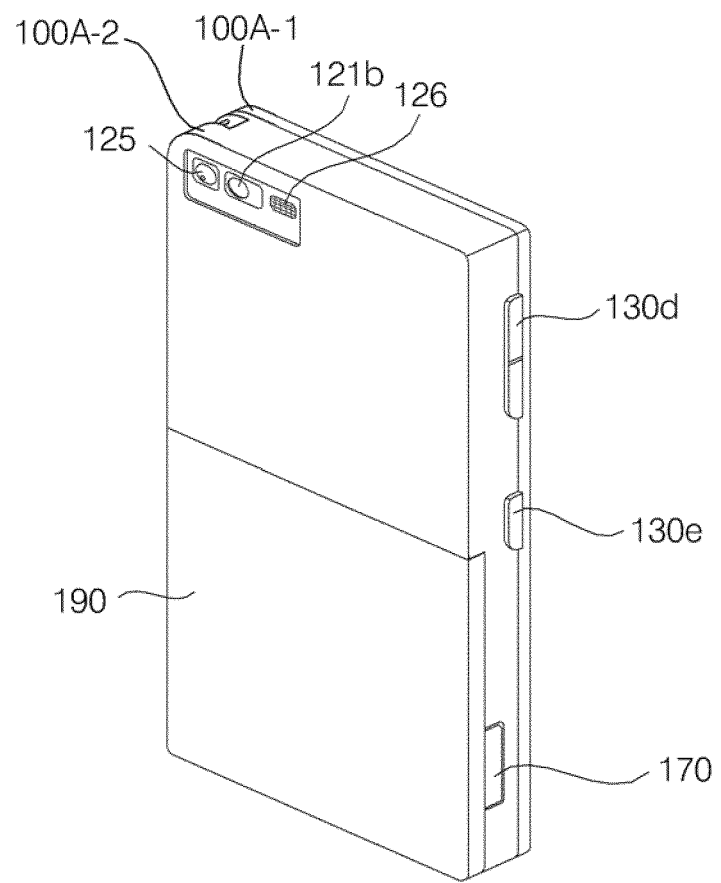
FIG. 3 illustrates a rear perspective view of the mobile terminal shown in FIG. 1.

FIG. 3 illustrates a rear perspective view of the mobile terminal 100 shown in FIG. 2. Referring to FIG. 3, a fourth user input unit 130d, a fifth user input unit 130e and the interface unit 170 may be disposed on one side of the rear case 100A-2, and a second camera 121b may be disposed at the rear of the rear case 100A-2.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A mirror 125 and a cameral flash 126 may be disposed near the second camera 121b. The mirror 125 may be used for the user to prepare himself or herself for taking a self shot. The cameral flash 126 may be used to illuminate a subject when the user attempts to capture an image of the subject with the second camera 121b.

A second audio output module (not shown) may be additionally provided in the rear case 100A-2. The second audio output module may realize a stereo function along with the first audio output module 153a. The second audio output module may also be used during a speaker-phone mode.

An antenna (not shown) for receiving a broadcast signal may be disposed on one side of the rear case 100A-2. The antenna may be installed so as to be able to be pulled out of the rear case 100A-2.

The interface unit 170 may serve as a path for allowing the mobile terminal 100 to exchange data with an external device. For example, the interface unit 170 may be a connector for connecting an earphone to the mobile terminal 100 in an either wired or wireless manner, a port for short-range communication or a power supply port for supplying power to the mobile terminal 100. The interface unit 170 may be a card socket for accommodating an exterior card such as a SIM or UIM card or a memory card.

The second camera 121b and the other elements that have been described as being provided on the rear case 100A-2 may be provided on the front case 100A-1.

In addition, the first camera 121a may be configured to be rotatable and thus to cover the photographing direction of the second camera 121b. In this case, the second camera 121b may be optional.

The power supply unit 190 may be disposed in the rear case 100A-2. The power supply unit may be a rechargeable battery and may be coupled to the rear case 100A-2 so as to be attachable to or detachable from the rear case 100A-2.

The proximity sensor 141, which is installed in the front case 100A-1, may detect an entity (such as the user's finger), if any, nearby and approaching the display module 151 and may output a proximity signal. The proximity sensor 141 may be configured to output various proximity signals according to the distance between the display module 151 and the detected entity. For this, a plurality of proximity sensors 141 with different detection ranges may be provided. Then, the distance between the display module 151 and the detected entity may be determined by comparing a plurality of proximity signals respectively provided by the plurality of proximity sensors 141. In addition, it may be determined what part of the display module 151 is being approached by the detected entity and whether the detected entity is being moved within the close vicinity of the display module 15 by determining which of the plurality of proximity sensors 141 is outputting a proximity signal. Then, the controller 180 may control the vibration module 157 to generate a haptic-effect signal corresponding to a touch key currently being approached by the detected entity.

Figure 4:
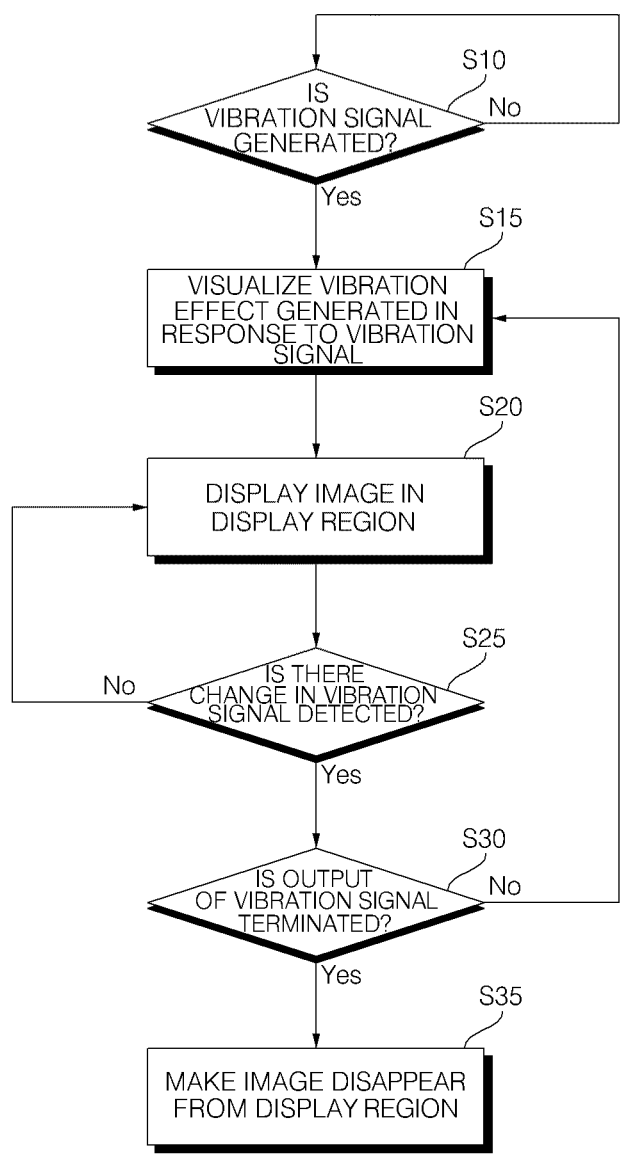
FIG. 4 illustrates a flowchart of a method of controlling a mobile terminal according to a first exemplary embodiment of the present invention.

FIG. 4 illustrates a flowchart of a method of controlling a mobile terminal according to a first exemplary embodiment of the present invention. The first exemplary embodiment will hereinafter be described, taking vibration as an example of a haptic effect. However, the present invention is not restricted to vibrations. Rather, the present invention can be applied to various haptic effects, other than vibration.

Referring to FIG. 4, if a call or message is received or if an event such as a touch input or a touch-and-drag input to the display module 151 occurs, the controller 180 may determine whether to generate a vibration signal (S10). Thereafter, the controller 180 may generate a vibration signal which determines the intensity, pattern, place of occurrence, moving direction and moving speed of vibration to be generated by the vibration module 157.

Thereafter, the controller 180 may visualize the intensity, pattern, moving direction and moving speed of the vibration to be generated and may thus generate a vibration-indicator image corresponding to the vibration to be generated (S15). Alternatively, the controller 180 may change a screen currently being displayed on the display module 151 according to the intensity, pattern, moving direction and moving speed of the vibration to be generated. For example, the controller 180 may vary at least one of the sharpness, color, shape, moving direction and moving speed of the current screen according to the intensity, pattern, moving direction and moving speed of the vibration to be generated.

Thereafter, the controller 180 may display the vibration-indicator image on the display module 151 (S20). The sharpness, color, shape, location, moving direction and moving speed of the vibration-indicator image may vary according to the pattern, place of occurrence, moving direction and moving speed of the vibration to be generated. Examples of the vibration-indicator image include an indicator icon representing the remaining battery power of the mobile terminal 100 or current time information, a menu icon for executing a menu, and a moving icon moving along with the vibration to be generated. The vibration-indicator image may be displayed at or around an area where the vibration to be generated is expected to occur.

Thereafter, the controller 180 may transmit the vibration signal to the vibration module 157 while continuously displaying the vibration-indicator image on the display module 151. Then, the vibration module 157 may generate vibration in response to the vibration signal. As a result, the user may be able to not only detect the vibration generated by the vibration module 157 with his or her sense of touch and but also identify the pattern, place of occurrence, moving direction and moving speed of the vibration generated by the vibration module 157 from the vibration-indicator image. Even if the mobile terminal 100 is placed in a manner mode and thus cannot generate vibration, the user may still identify the pattern, place of occurrence, moving direction and moving speed of vibration that may have been generated otherwise from the vibration-indicator image.

Thereafter, the controller 180 may detect a change, if any, in the vibration signal (S25). When the vibration signal changes, at least one of the pattern, place of occurrence, moving direction and moving speed of vibration generated by the vibration module 157 may vary. If a new event occurs, the controller 180 may generate a new vibration signal. In this case, it may be determined that the existing vibration signal has changed. If an event involving the input of a user command occurs, the controller 180 may generate a vibration signal corresponding to the user command.

If the vibration module 157 stops generating vibration (S30), the controller 180 may make the vibration-indicator image disappear from the display module 151 (S35). Then, the user may easily identify that the generation of vibration has been terminated not only with his or her sense of touch but also with his or her sense of sight.

If the vibration module 157 is yet to stop generating vibration (S30), the method returns to operation S15. When the vibration signal changes, at least one of the pattern, place of occurrence, moving direction and moving speed of vibration generated by the vibration module 157 may change accordingly. As a result, at least one of the sharpness, color, shape, location, moving direction and moving speed of the vibration-indicator image may change.

That is, the controller 180 may vary the vibration-indicator image in response to a new vibration signal.

In this manner, it is possible for the user to visually identify the pattern, place of occurrence, moving direction and moving speed of vibration generated by the vibration module 157.

Figure 5:
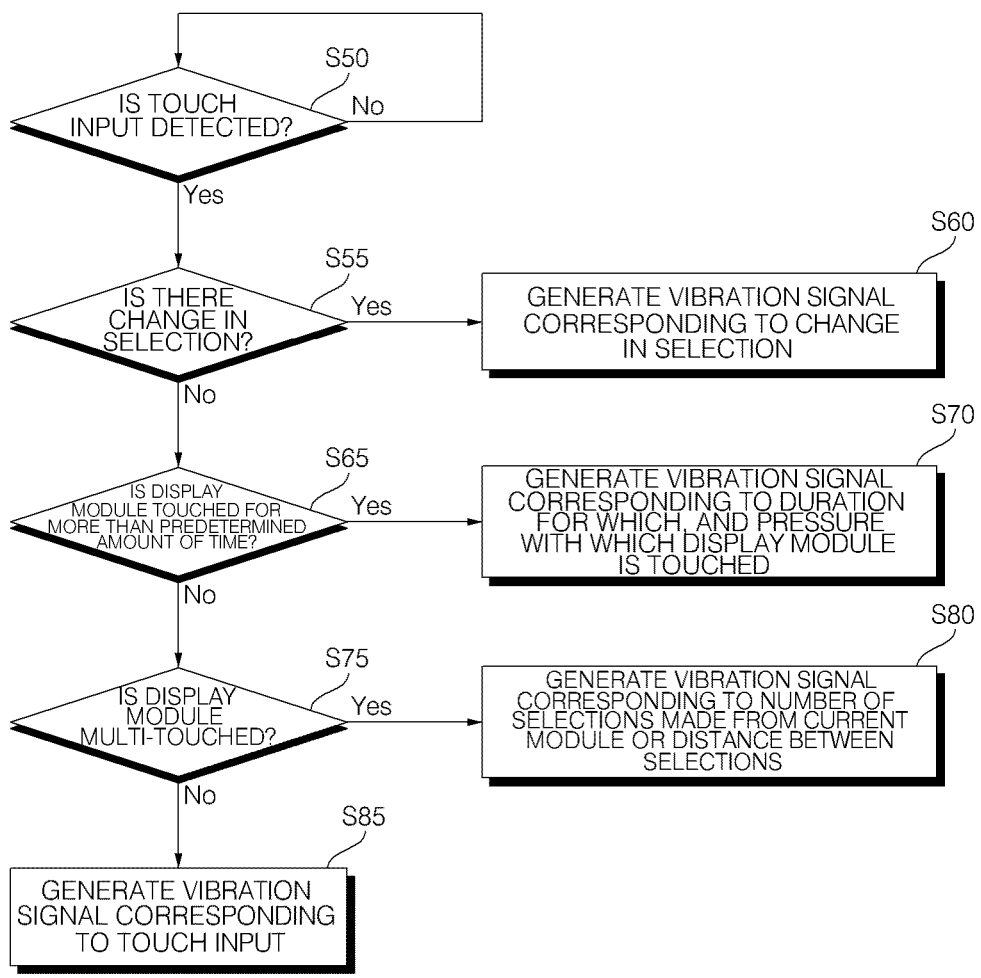
FIG. 5 illustrates a flowchart of a method of controlling a mobile terminal according to a second exemplary embodiment of the present invention.

FIG. 5 illustrates a flowchart of a method of controlling a mobile terminal according to a second exemplary embodiment of the present invention, and particularly, how to generate a vibration signal. Referring to FIG. 5, if the display module 151 includes a touch screen, the controller 180 may generate a vibration signal that controls the vibration module 157 to generate vibration when the touch screen is touched. As a result, the user may easily identify whether the touch screen is touched with his or her sense of touch based on vibration generated by the vibration module 157.

More specifically, the controller 180 may generate a vibration signal corresponding to the user's way of touching the display module 151 such as what part of the display module 151 is touched and for how long and with how much pressure the display module 151 is touched. The vibration module 157 may generate vibration in response to the vibration signal. At least one of the pattern, place of occurrence, moving direction and moving speed of the vibration may vary according to the user's way of touching the display module 151. The user's way of touching the display module 151 for producing a vibration signal may be set in various manners and thus does not restrict the scope of the present invention.

In addition, the controller 180 may display a vibration-indicator image representing the vibration generated by the vibration module 157 on the display module 151. At least one of the sharpness, color, shape, location, moving direction and moving speed of the vibration-indicator image may correspond to at least one of the pattern, place of occurrence, moving direction and moving speed of the vibration generated by the vibration module 157. Therefore, the user may visually identify whether the display module 151 is touched based on the vibration-indicator image.

More specifically, if a selection is made from a screen currently being displayed on the display module 151 in response to a touch input (S50), the controller 180 may determine whether the selection changes due to, for example, a drag input (S55). If the selection changes (S55), the controller 180 may generate a first vibration signal corresponding to the direction and speed of change of the selection, and may transmit the first vibration signal to the vibration module 157 (S60). Then, the vibration module 157 may generate a first vibration in response to the first vibration signal. At least one of the pattern, place of occurrence, moving direction and moving speed of the first vibration may correspond to the direction and speed of change of the selection. In addition, the controller 180 may display a first vibration-indicator image representing the first vibration on the display module 151. At least one of the sharpness, color, shape, location, moving direction and moving speed of the first vibration-indicator image may correspond to the first vibration. Alternatively, the controller 180 may change the current screen according to the first vibration. Therefore, the user may visually identify how the display module 151 has been touched.

On the other hand, if the selection is yet to change (S55), the controller 180 may determine whether the selection has been made by touching the display module 151 for more than a predetermined amount of time (S65). If it is determined that the selection has been made by touching the display module 151 for more than the predetermined amount of time, it may appear that the user has been manipulating an icon for, for example, adjusting sound volume or playback speed. In this case, the controller 180 may generate a second vibration signal corresponding to the duration for which and the pressure with which the display module 151 has been touched in order to make the selection, and may transmit the second vibration signal to the vibration module 157 (S70). Then, the vibration module 157 may generate a second vibration in response to the second vibration signal. At least one of the pattern, place of occurrence, moving direction and moving speed of the second vibration may correspond to the duration for which, and the pressure with which the display module 151 has been touched in order to make the selection. In addition, the controller 180 may display a second vibration-indicator image representing the second vibration on the display module 151. At least one of the sharpness, color, shape, location, moving direction and moving speed of the second vibration-indicator image may correspond to the second vibration. Alternatively, the controller 180 may change the current screen according to the second vibration. Therefore, the user may identify for how long and with how much pressure the display module 151 has been touched in order to make the selection not only based on the second vibration but also based on the second vibration-indicator image.

On the other hand, if the selection is yet to change, or that the selection has been made by touching the display module 151 only for less than the predetermined amount of time, the controller 180 may determine whether the display module 151 has been multi-touched, i.e., whether at least two selections have been made from the current screen (S75). The display module 151 may be determined to be multi-touched when two or more touch keys, for example, a 'shift' key and a character-input key, are selected at the same time. Thereafter, the controller 180 may generate a third vibration signal corresponding to the number of selections made from the current screen or the distance between the selections. Then, the vibration module 157 may generate a third vibration in response to the third vibration signal. At least one of the pattern, place of occurrence, moving direction and moving speed of the third vibration may correspond to the number of selections made from the current screen or the distance between the selections made from the current screen. In addition, the controller 180 may display a third second vibration-indicator image representing the third vibration on the display module 151. At least one of the sharpness, color, shape, location, moving direction and moving speed of the third vibration-indicator image may correspond to the third vibration. Alternatively, the controller 180 may change the current screen according to the third vibration. Therefore, the user may easily identify the pattern, place of occurrence, moving direction and moving speed of the third vibration with his or her sense of touch or vision.

On the other hand, even if the selection is yet to change or has been made by touching the display module 151 only for a short time, or that no multi-touch input has been detected from the display module 151, the controller 180 may still be able to detect a command input to the mobile terminal 100 based on the user's way of touching the display module 151. Thereafter, the controller 180 may generate a fourth vibration signal corresponding to the input command (S85). Then, the vibration module 157 may generate a fourth vibration in response to the fourth vibration signal. The controller 180 may display a fourth second vibration-indicator image representing the fourth vibration on the display module 151 or may change the current screen displayed on the display module 151 according to the fourth vibration.

FIGS. 6 through 27 illustrate diagrams of screens for explaining the methods of the first and second exemplary embodiments. The pattern, place of occurrence, moving direction, and moving speed of vibration and the way of touching the display module 151 for generating vibration signal, as set forth herein, do not restrict the scope of the present invention. Likewise, the sharpness, color, shape, location, moving direction and moving speed of a vibration-indicator image, as set forth herein, do not restrict the scope of the present invention.

The controller 180 may generate a vibration signal for generating vibration upon the occurrence of an event such as receiving a call or a message or setting off the alarm. Unless the mobile terminal 100 is placed in a manner mode, the controller 180 may transmit the vibration signal to the vibration module 157. Then, the vibration module 157 may generate vibration whose pattern, place of occurrence, moving direction and/or moving speed correspond(s) to the vibration signal. The controller 180 may display a vibration-indicator image representing the vibration generated by the vibration module 157 on the display module 151 or change a screen currently being displayed on the display module 151 according to the vibration, and this will hereinafter be described in further detail with reference to FIGS. 6 through 27.

Figure 6:
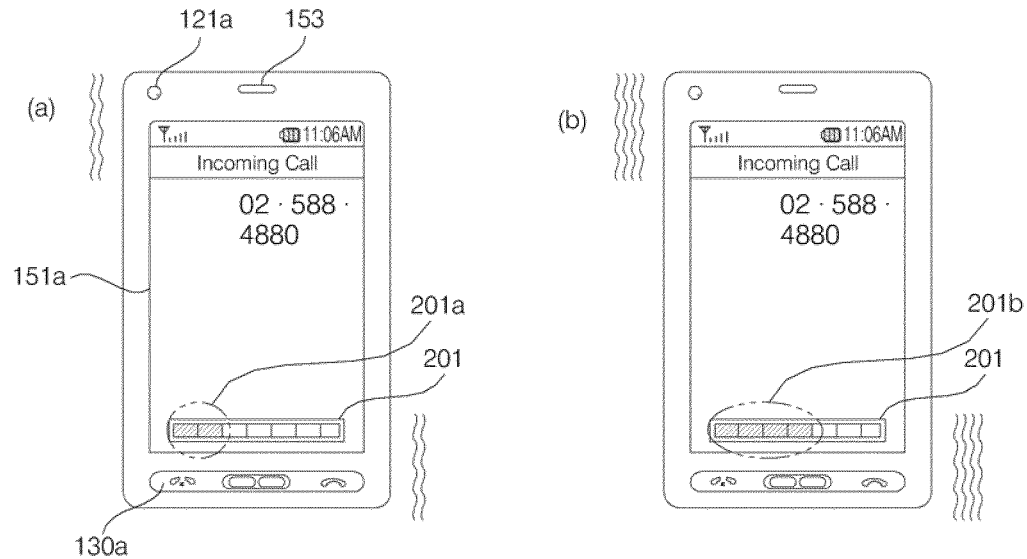
FIGS. 6 through 27 illustrate diagrams of screens for explaining the methods of the first and second exemplary embodiments.

Referring to FIG. 6, when the vibration module 157 generates vibration in response to the detection of an incoming call, the controller 180 may display a bar-shaped image 201 in a display region 151a as a vibration-indicator image representing the generated vibration. The length of the bar-shaped image 201 or the amount by which the bar-shaped image 201 is filled with a color may correspond to the intensity of the generated vibration. Alternatively, the length of the bar-shaped image 201 or the amount by which the bar-shaped image 201 is filled with a color may correspond to at least one of the frequency, place of occurrence, moving direction and moving direction of the generated vibration.

More specifically, the bar-shaped image 201 may be filled with a color in proportion to the intensity of the generated vibration. More specifically, referring to FIG. 6(a), when a vibration signal for generating weak vibration is detected, two blocks, from the left, in the bar-shaped image 201 may be filled, as indicated by reference numeral 201a. On the other hand, referring to FIG. 6(b), when a vibration signal for generating strong vibration is detected, four blocks, from the left, in the bar-shaped image 201 may be filled, as indicated by reference numeral 201b.

That is, the controller 180 may vary the amount by which the bar-shaped image 201 is filled with a color according to the intensity of vibration. Therefore, the user may easily identify the intensity of vibration based on how much of the bar-shaped image 201 is filled with a color. The controller 180 may vary the length of the bar-shaped image 201 according to the intensity of vibration.

Figure 7:
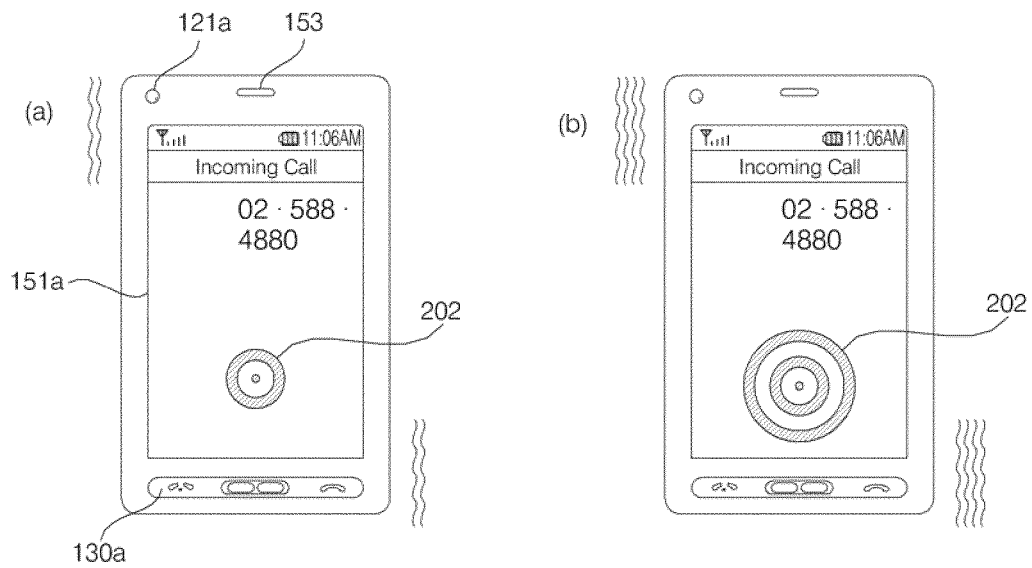

Referring to FIG. 7, the controller 180 may display a circular image 202 whose radius or color corresponds to at least one of the pattern, place of occurrence, moving direction and moving speed of vibration in the display region 151a as a vibration-indicator image. In particular, the radius or color of the circular image 202 may vary according to the intensity of vibration.

More specifically, referring to FIG. 7(a), when a low-intensity vibration is generated, a circular image 202 having a small radius or a bright color may be displayed. On the other hand, referring to FIG. 7(b), when a high-intensity vibration is generated, a circular image 202 having a greater radius and a darker color than the circular image 202 shown in FIG. 7(a) may be displayed. That is, the controller 180 may increase the radius or saturation of the circular image 202 according to the intensity of vibration. As a result, the user may easily identify the intensity of vibration not only with his or her sense of touch but also with his or her sense of sight.

Figure 8:
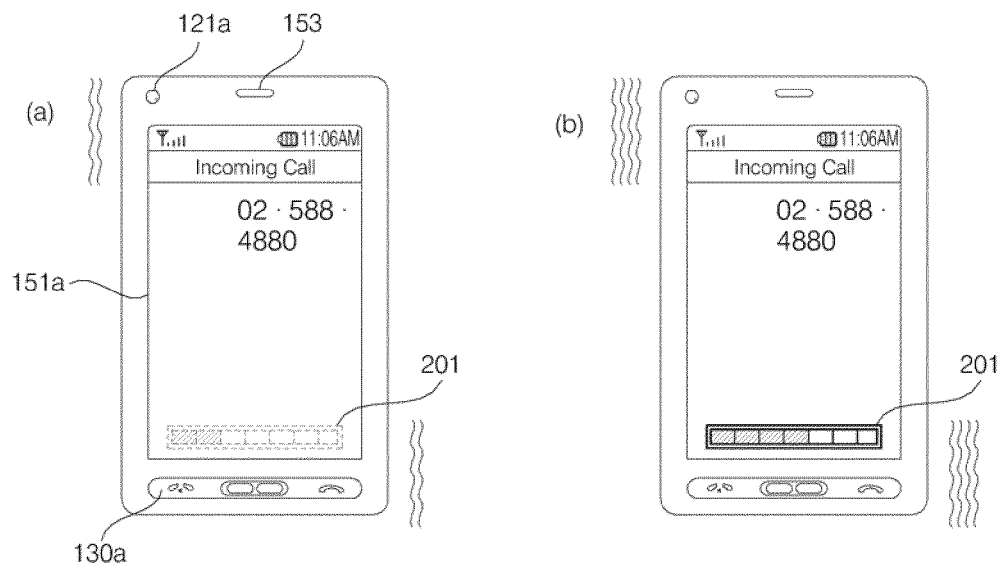

Referring to FIG. 8, the controller 180 may display an image whose sharpness corresponds to the intensity of vibration as a vibration-indicator image. More specifically, referring to FIG. 8(a), when a low-intensity vibration is generated, the controller 180 may reduce the sharpness of a bar-shaped image 201. On the other hand, when a high-intensity vibration is generated, the controller 180 may increase the sharpness of the bar-shaped image 201.

Therefore, the user may identify the intensity of vibration with his or her sense of sight based on the sharpness of a vibration-indicator image representing the vibration. Alternatively, the controller 180 may display an image whose sharpness corresponds to the frequency of vibration, instead of displaying an image whose sharpness corresponds to the intensity of vibration, as a vibration-indicator image.

Figure 9:
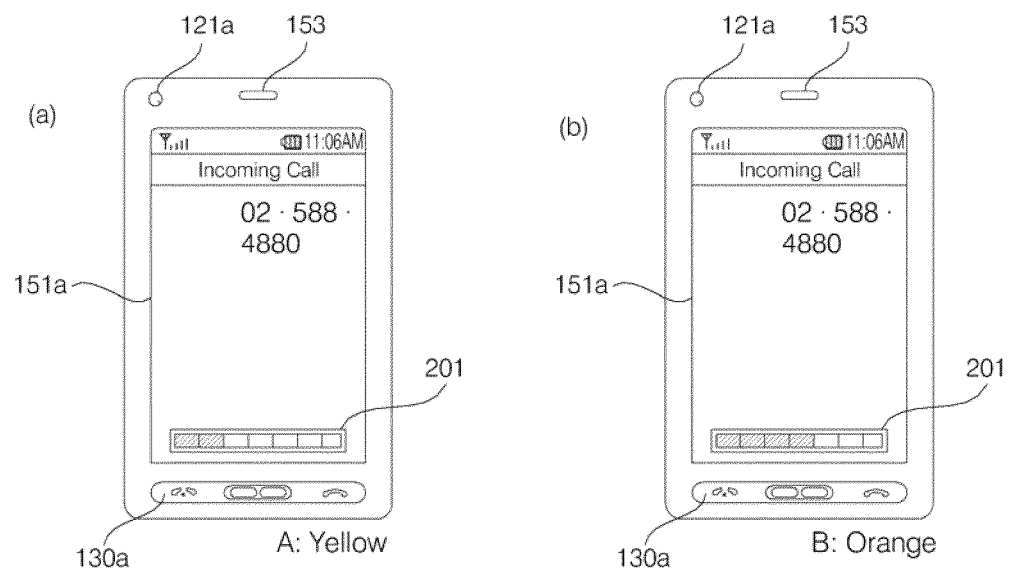

Referring to FIG. 9, the controller 180 may display an image whose color corresponds to the pattern of vibration as a vibration-indicator image.

More specifically, referring to FIG. 9(a), when a pattern-A vibration is generated, the controller 180 may display a yellow bar-shaped icon 201 in the display region 151a. On the other hand, referring to FIG. 9(b), when a pattern-B vibration is generated, the controller 180 may display an orange bar-shaped icon 201 in the display region 151a.

Therefore, the user may easily identify the pattern of vibration based on the color of a vibration-indicator image. Particularly, the controller 180 may display an image whose color corresponds to the intensity or frequency of vibration as a vibration-indicator image.

The pattern of vibration may be interpreted as the variation of the intensity of the vibration over time. The pattern of vibration whose intensity varies periodically may be interpreted as the change of the frequency of the vibration. The pattern of vibration whose intensity varies, but not periodically, may be interpreted as the pattern of change of the intensity of the vibration.

Figure 10:
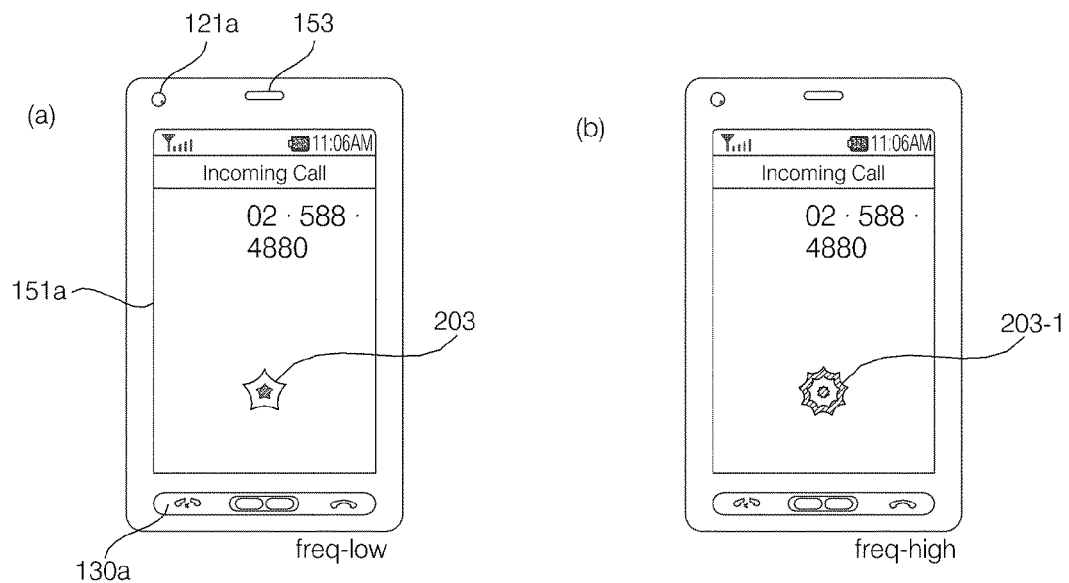

Referring to FIG. 10, the controller 180 may display an image whose shape corresponds to the frequency of variation as a vibration-indicator image.

More specifically, referring to FIG. 10(a), when a low-frequency vibration is generated, the controller 180 may display an image 203, which is relatively simple, in the display region 151a. On the other hand, when a high-frequency vibration is generated, the controller 180 may display an image 203-1, which is more complicated than the image 203, in the display region 151a.

Therefore, the user may visually identify the frequency of vibration based on the shape of a vibration-indicator image. Alternatively, the controller 180 may display an image whose shape corresponds to the intensity of variation, instead of displaying an image whose shape corresponds to the frequency of variation.

The methods of the first and second exemplary embodiments will hereinafter be described in further detail with reference to FIGS. 11 through 25, assuming that the display module 151 is a touch screen.

As mentioned above with reference to FIG. 5, the controller 180 may generate a vibration signal corresponding to the user's way of touching a touch screen (such as whether there is a change in a selection made from a screen currently being displayed on the touch screen in response to a touch input, for how long and with how much pressure the touch screen has been touched, and how many places on the touch screen have been touched). Then, the vibration module 157 may generate vibration, and at least one of the pattern, place of occurrence, moving direction and moving speed of the vibration may correspond to the user's way of touching the touch screen. The controller 180 may display a vibration-indicator image on the touch screen or may change a screen currently being displayed on the touch screen in order to visually alert the user to the generation of the vibration.

Figure 11:
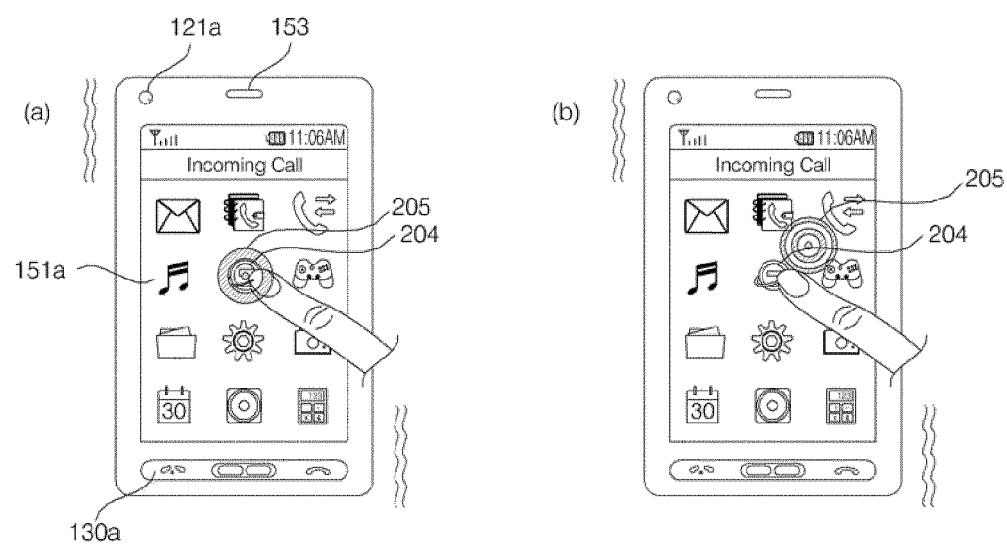

Referring to FIG. 11, if the user touches an icon 204, vibration may be generated, and a circular image 205 may be displayed in the display region 151a as a vibration-indicator image. The sharpness, color, shape, and/or location of the circular image 205 may correspond to the pattern and location of the vibration.

More specifically, referring to FIG. 11(a), the controller 180 may display the circular image 205 over the icon 204. Alternatively, referring to FIG. 11(b), the controller 180 may display the circular image 205 near the icon 204.

At least one of the pattern, place of occurrence, moving direction and moving speed of vibration generated in response to a vibration signal generated by the controller 180 may correspond to a way of touching a touch screen or a command input to the mobile terminal 100 according to the way of touching the touch screen. Different vibrations may be generated for different icons. In short, when an icon is touched, vibration may be generated, and the controller 180 may display a vibration-indicator image whose sharpness, color, shape and/or location correspond(s) to the vibration over or near the icon.

It will hereinafter be described with reference to FIGS. 12 through 17 how to visualize vibration when a selection made from a screen currently being displayed on a touch screen in response to a touch input changes.

If a selection is made from a screen currently displayed on a touch screen in response to a touch input and then the selection changes due to, for example, a drag input, the controller 180 may generate a vibration signal for generating vibration corresponding to the direction and speed of change of the selection.

If the user touches and then drags an icon, the vibration module 157 may generate vibration along a path of movement of the icon. The intensity of vibration may increase in proportion to the speed of dragging. The pattern, frequency, moving direction and moving speed of vibration may correspond to the direction and speed of change of a selection made in response to a touch input. That is, the controller 180 may generate a vibration signal for generating vibration whose pattern, place of occurrence, moving direction and/or moving speed correspond(s) to the direction and speed of change of a selection made in response to a touch input. Thereafter, the controller 180 may display a vibration-indicator image representing at least one of the pattern, place of occurrence, moving direction and moving speed of vibration to be generated in response to the vibration signal on the display module 151. As a result, the user may visually identify vibration generated in response to a change in a selection based on a vibration-indicator image.

Figure 12:
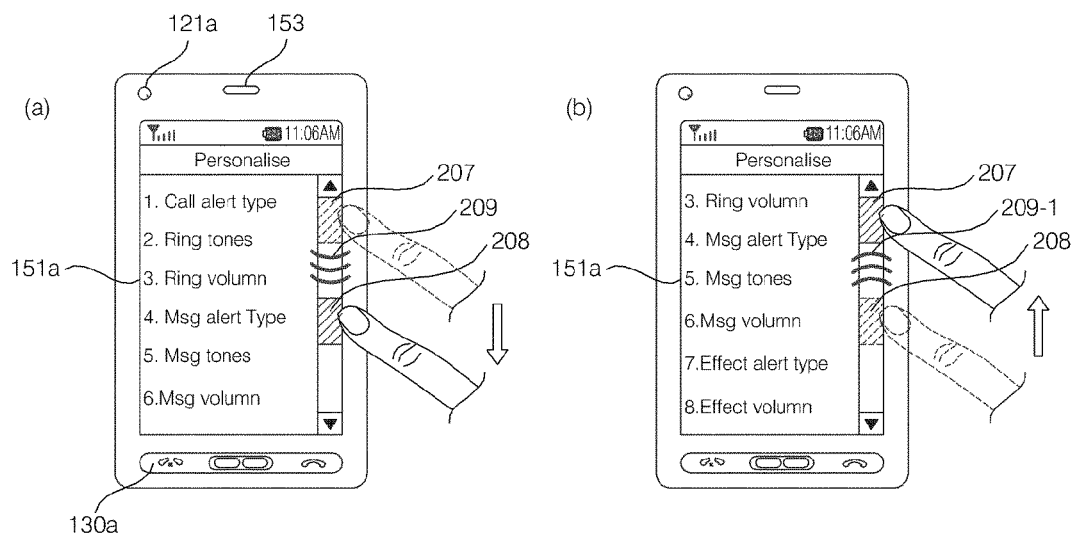
Figure 13:
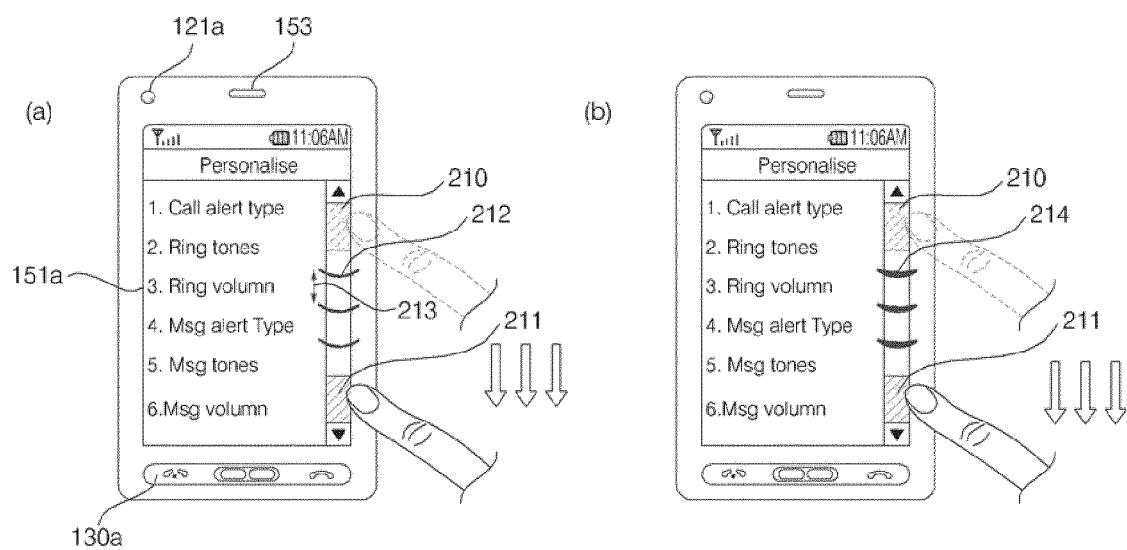
Figure 14:
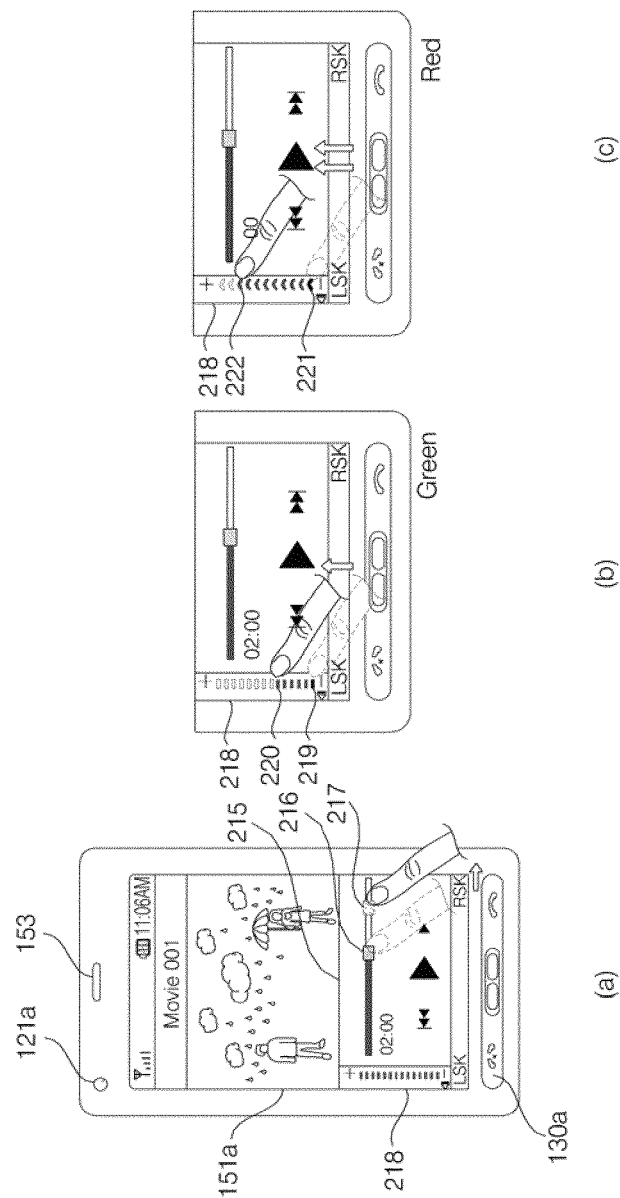
Figure 15:
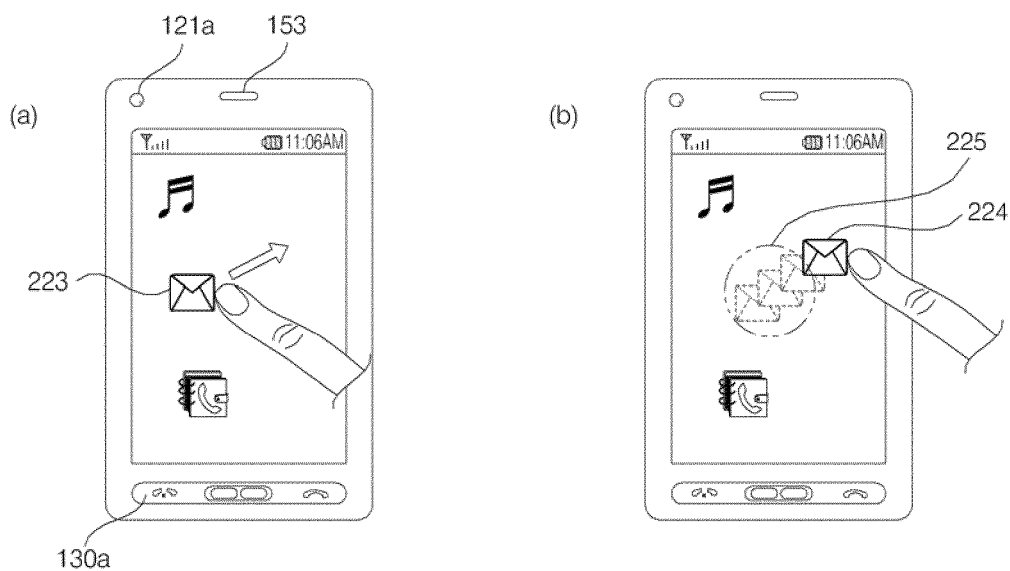
Figure 16:
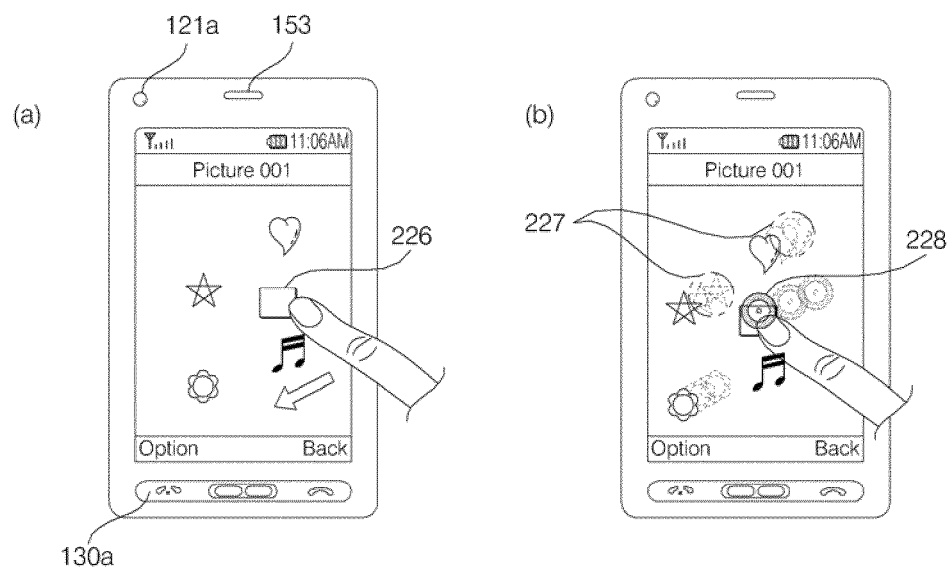

Referring to FIGS. 12 and 13, the controller 180 may display a wave pattern as a vibration-indicator image.

More specifically, referring to FIG. 12(a), if the user touches a scrollbar and then drags the slider in the scrollbar from a point 207 to a point 208, the controller 180 may generate a vibration signal for generating vibration along a path of the movement of the slider in the scrollbar. Then, the vibration module 157 may generate vibration along the path from the point 207 to the point 208. The user may instantly identify the generated vibration with his or her sense of touch. Thereafter, the controller 180 may display a wave pattern 209 over the scrollbar as a vibration-indicator image. The wave pattern 209 may represent the moving direction of vibration.

On the other hand, referring to FIG. 12(a), if the user drags the slider in the scrollbar from the point 208 to the point 207, the controller 180 may generate a vibration signal for generating vibration along a path of the movement of the slider in the scrollbar. Then, the vibration module 157 may generate vibration along the path from the point 208 to the point 207. The user may instantly identify the generated vibration with his or her sense of touch. Thereafter, the controller 180 may display a wave pattern 209-1, which is the reverse of the wave pattern 209 shown in FIG. 12(a), over the scrollbar as a vibration-indicator image.

In this manner, the user may easily identify vibration generated by the vibration module 157 not only based on his or her sense of touch but also based on with his or her sense of sight.

Referring to FIGS. 13(a) and 13(b), the controller 180 may display a wave pattern including a plurality of wavy lines and representing vibration as a vibration-indicator image. The wave pattern may change according to the moving speed of the slider in a scrollbar. More specifically, as the moving speed of the slider in a scrollbar varies, the moving speed of the vibration may vary. As a result, at least one of the distance between the wavy lines and the thickness of the wavy lines may vary.

Referring to FIG. 13(a), a distance 213 between a plurality of wavy lines 212 may vary according to the moving speed of vibration. More specifically, the distance 213 may increase in proportion to the moving speed of vibration.

Alternatively, referring to FIG. 13(b), the thickness of wavy lines 214 may vary according to the moving speed of vibration. More specifically, the thickness of the wavy lines 214 may increase in proportion to the moving speed of vibration.

Therefore, the user may visually identify the moving speed of vibration based on the distance between and the thickness of wavy lines representing the vibration. The controller 180 may vary the sharpness, color, shape, moving direction or moving speed of a wave pattern representing vibration according to the pattern, place of occurrence, and moving direction of the vibration.

Referring to FIGS. 14(a) through 14(c), during the play of a video or audio file, a progress bar 215 for skipping ahead or backwards and a progress bar 218 for increasing or reducing sound volume may be displayed in the display region 151a.

Referring to FIG. 14(a), if the user drags the indicator in the progress bar 215 from a point 216 to a point 217 in order to skip ahead, the controller 180 may generate a vibration signal. Then, the vibration module 157 may generate vibration whose moving direction or moving speed corresponds to the direction in which, and the speed at which the indicator in the progress bar 215 is dragged in response to the vibration signal.

The controller 180 may change the sharpness, color or shape of the progress bar 215 according to the vibration generated by the vibration module 157. For example, the controller 180 may gradually reduce the sharpness of the progress bar 215 as the indicator in the progress bar 215 moves from the point 216 to the point 217 by being dragged. As a result, the user may visually identify that vibration has been generated based on the reduction in the sharpness of the progress bar 215. Alternatively, the controller 180 may reduce the sharpness of a portion of the progress bar 215 near the point 216 or increase the sharpness of a portion of the progress bar 215 near the point 217 in consideration of the moving direction of the vibration generated by the vibration module 157. Therefore, the user may visually identify the pattern of the vibration generated by the vibration module 157 simply by comparing the sharpness of one portion of the progress bar 215 with the sharpness of another portion of the progress bar 215.

Referring to FIG. 14(b), if the user drags the indicator in the progress bar 218 from a point 219 to a point 220, vibration may be generated along a direction from the point 219 to the point 220. Then, the controller 180 may turn the progress bar 218 green in consideration that the moving distance of the vibration is relatively short, or that the intensity of the vibration is relatively low.

On the other hand, referring to FIG. 14(c), if the user drags the indicator in the progress bar 218 from a point 221 to a point 222, vibration may be generated along a direction from the point 221 to the point 222. Then, the controller 180 may turn the progress bar 218 red in consideration that the moving distance of the vibration is relatively long, or that the intensity of the vibration is relatively high. Alternatively, the controller 180 may vary the shape of the progress bar 218 according to the moving direction of vibration.

In short, the controller 180 may generate a vibration signal for generating vibration whose pattern, place of occurrence, moving direction and/or moving speed correspond(s) to how the indicator in a progress bar is touched and/or dragged. In addition, the controller 180 may change at least one of the sharpness, color, shape, moving direction and moving speed of a progress bar according to the type of vibration generated in response to a vibration signal. In this manner, the user may visually identify vibration generated by the vibration module 157.

Referring to FIG. 15(a), if the user drags an icon from a point 223 to a point 224, the controller 180 may generate a vibration signal for generating vibration whose pattern, place of occurrence, moving direction and/or moving speed correspond(s) to the moving direction and moving speed of the icon. More specifically, the controller 180 may generate a vibration signal for generating vibration whose moving direction and moving speed correspond to the moving direction and moving speed, respectively, of the icon. The vibration module 157 may generate vibration in response to the vibration signal generated by the controller 180. Then, the user may instantly identify the vibration generated by the vibration module 157 with his or her sense of touch.

Thereafter, referring to FIG. 15(b), the controller 180 may apply an afterimage effect to the icon so that a trail 225 of afterimages can be left behind the icon as the icon moves. At least one of the sharpness, color, and shape of the afterimage trail 225 and the moving direction and moving speed represented by the afterimage trail 225 may correspond to the moving direction and speed of the generated vibration. More specifically, the moving direction and moving speed represented by the afterimage trail 225 may correspond to the moving direction and moving speed, respectively, of the icon. Therefore, the user may also identify visually the vibration generated by the vibration module 157.

Alternatively, the controller 180 may vary at least one of the sharpness, color, and shape of the afterimage trail 225 and the moving direction and moving speed represented by the afterimage trail 225 according to at least one of the pattern and place of occurrence of the vibration generated by the vibration module 157.

Referring to FIGS. 16(a) and 16(b), if a content item 'Picture 001' is displayed in the entire display region 151a and the user drags the content item 'Picture 001' from a point 226 to a point 228, the controller 180 may move the content item 'Picture 001' in the direction from the point 226 to the point 228 and may then generate a vibration signal for generating vibration in order to alert the user to the movement of the content item 'Picture 001'.

The vibration module 157 may generate vibration in response to the vibration signal generated by the controller 180. The moving direction and moving speed of the vibration generated by the vibration module 157 correspond to the moving direction and moving speed, respectively, of the content item 'Picture 001'. Therefore, the user may easily identify whether the content item 'Picture 001' has been dragged based on the vibration generated by the vibration module 157.

In addition, the controller 180 may apply an afterimage effect to each of a number of objects displayed in the content item 'Picture 001' so that a trail 227 of afterimages can be left behind each of the objects as a corresponding object moves. A moving direction and moving speed represented by the afterimage trails 227 of the objects may correspond to the moving direction and moving speed, respectively, of the vibration generated by the vibration module 157. That is, the higher the moving speed of the vibration generated by the vibration module 157, the higher the moving speed represented by the afterimage trails 227 of the objects. Therefore, the user may visually identify the vibration generated by the vibration module 157 based on the afterimage trails 227 of the objects.

Alternatively, the controller 180 may generate a vibration signal for generating vibration whose pattern and/or place of occurrence correspond(s) to the direction and/or speed of dragging. Still alternatively, the controller 180 may generate a vibration signal for generating vibration whose pattern corresponds to not only the moving direction and moving speed represented by the afterimage trails 227 but also at least one of the sharpness, color and shape of the afterimage trails 227.

Figure 17:
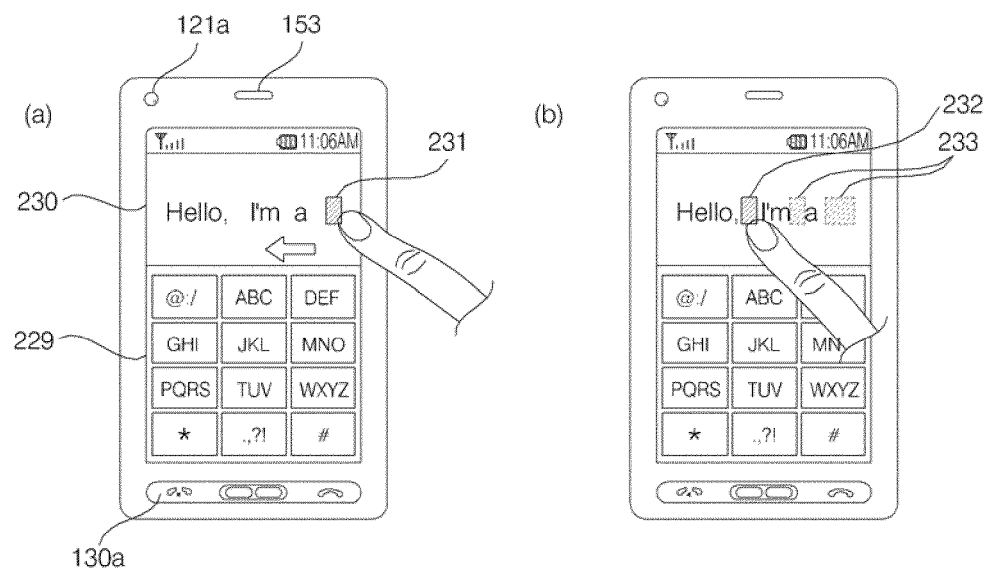

Referring to FIGS. 17(*a*) and 17(*b*), the controller 180 may display a character-input window 229 for inputting characters and a character-display window 230 for displaying a number of characters input through the character-input window 220. The character-input window 229 may be implemented as a keypad, a keyboard, or a group of command-input keys.

If a cursor displayed in the character-display window 230 moves by being dragged by the user, the controller 180 may generate a vibration signal for generating vibration whose moving direction or moving speed corresponds to the moving direction or moving speed of the cursor.

More specifically, if the user drags the cursor from a point 231 to a point 232, the vibration module 157 may generate vibration whose moving direction and moving speed correspond to the moving direction and moving speed of the cursor. Then, the user may identify the movement of the cursor based on the vibration generated by the vibration module 157.

The controller 180 may apply an afterimage effect to the cursor so that a trail 233 of afterimages can be left behind the cursor as the cursor moves. The higher the moving speed of the vibration generated by the vibration module 157, the higher the moving speed represented by the afterimage trail 233. Therefore, the user may visually identify the vibration generated by the vibration module 157.

Alternatively, the controller 180 may generate a vibration signal for generating vibration whose pattern and/or place of occurrence correspond(s) to the direction and speed of dragging. Still alternatively, the controller 180 may generate a vibration signal for generating vibration whose pattern corresponds to not only the moving direction and moving speed represented by the afterimage trail 233 but also at least one of the sharpness, color and shape of the afterimage trail 233.

FIGS. 18 through 23 illustrate screens for explaining how to visualize vibration generated by the vibration module 157 when a touch input is detected from a certain part of a touch screen for more than a predetermined amount of time.

The controller 180 may generate a vibration signal for generating vibration whose pattern, place of occurrence, moving direction and/or moving speed correspond(s) to the duration for which, or the pressure with which a touch screen is touched. In addition, the controller 180 may display a vibration-indicator image representing at least one of the sharpness, color, shape, moving direction and moving speed of vibration generated in response to the vibration signal. As a result, the user may easily identify the generated vibration not only with his or her sense of sight but also with his or her sense of touch.

Figure 18:
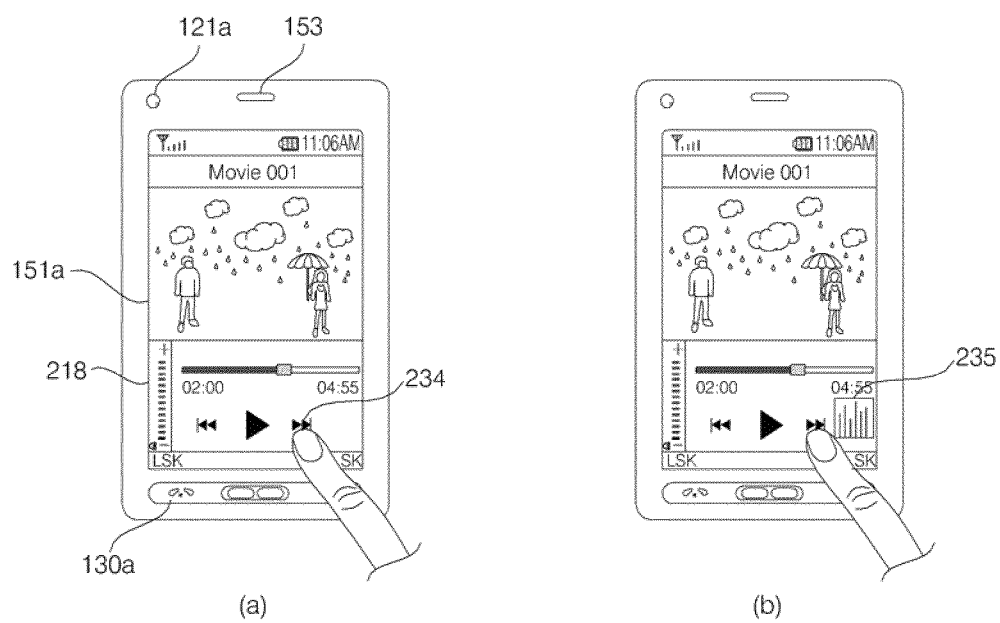

Referring to FIG. 18(*a*), during the play of a video file 'Movie 001', the user may touch a key 234 to skip ahead for more than a predetermined amount of time. In this case, the controller 180 may generate a vibration signal for generating vibration corresponding to the duration for which, or the pressure with which the key 234 is touched. The user may identify whether the key 234 is being touched based on the intensity of vibration generated in response to the vibration signal by the vibration module 157. As the duration for which, or the pressure with which the key 234 is touched increases, the intensity of the vibration generated by the vibration module 157 may gradually increase.

Referring to FIG. 18(*b*), the controller 180 may display a graph image 235 near the key 234 as a vibration-indicator image representing the vibration generated by the vibration module 157. Then, the user may identify the intensity of the vibration generated by the vibration module 157 based on the graph image 235.

Alternatively, not only the intensity but also the pattern, frequency, moving direction and moving speed of the vibration generated by the vibration module 157 may vary according to the duration for which, or the pressure with which the key 234 is touched. Still alternatively, the controller 180 may display a vibration-indicator image whose sharpness, color, shape, moving direction and/or moving speed correspond(s) to the vibration generated by the vibration module 157. Therefore, the user may visually identify the vibration generated by the vibration module 157.

Figure 19:
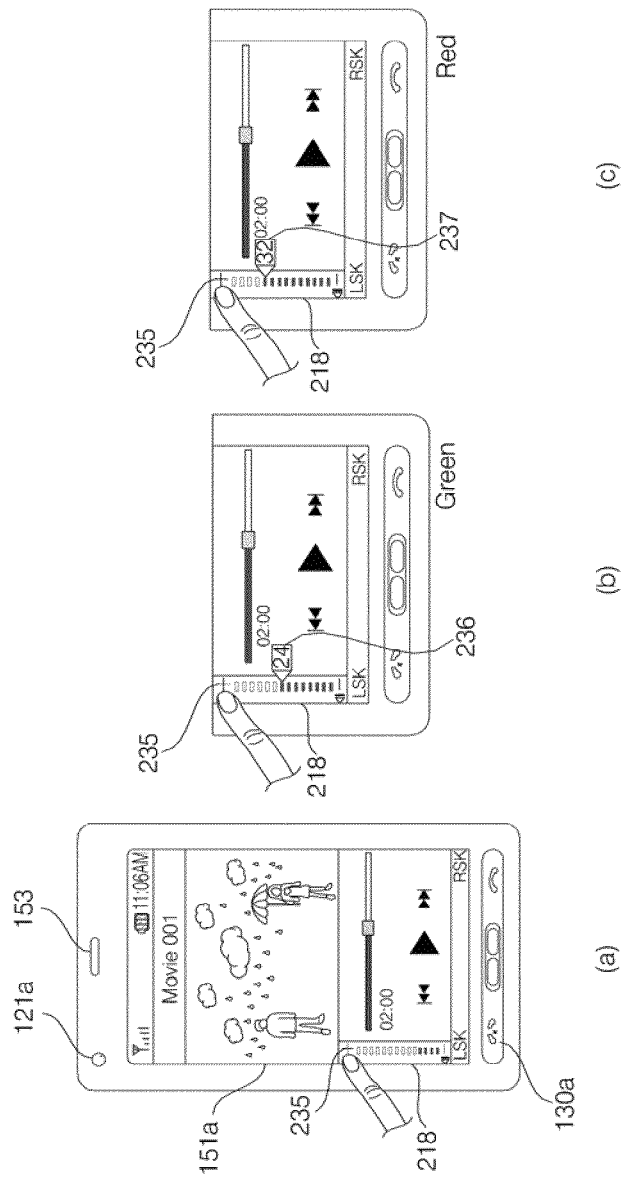
Figure 20:
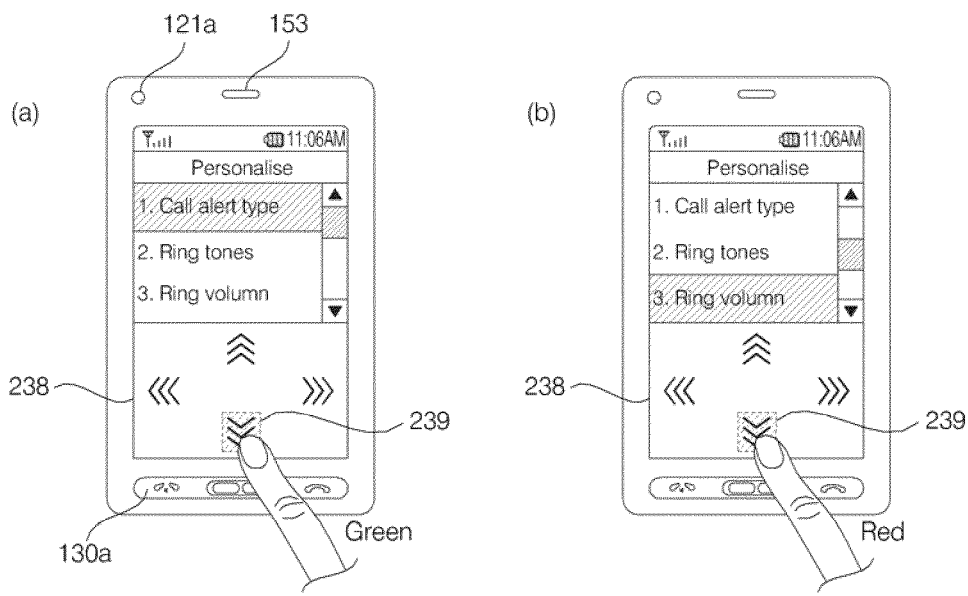
Figure 21:
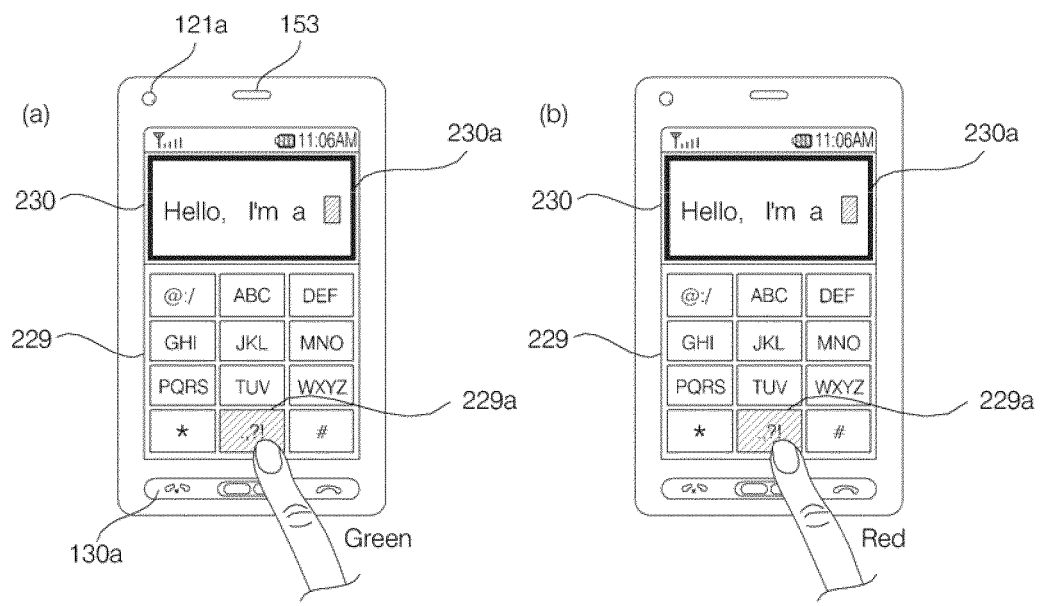
Figure 22:
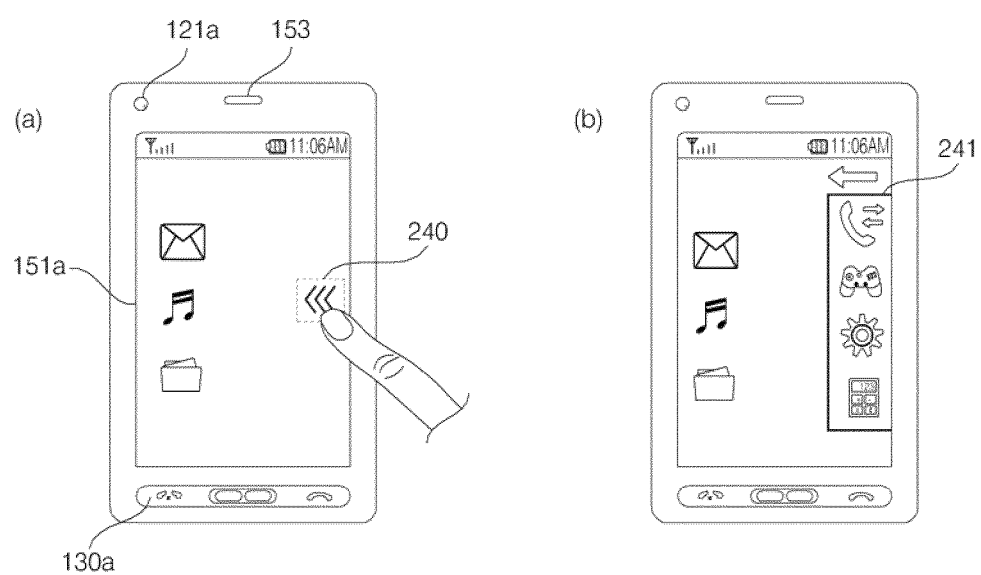

FIGS. 19 through 21 illustrate diagrams of screens for explaining how to change the color of an image or a text message according to at least one of the pattern, place of occurrence, moving direction and moving speed of vibration.

Referring to FIGS. 19(*a*) through 19(*c*), a text message may be displayed in the display region 151*a* in order to represent vibration generated by the vibration module 157.

More specifically, referring to FIG. 19(*a*), the controller 180 may display a progress bar 218 for adjusting the sound volume of the video file 'Movie 001' in the display region 151*a*. The user may increase the sound volume of the video file 'Movie 001' by touching a key 235 to increase sound volume for more than a predetermined amount of time. Then, the controller 180 may generate a vibration signal for generating vibration whose intensity increases in proportion to the sound volume of the video file 'Movie 001.' As the sound volume of the video file 'Movie 001' increases, the intensity of vibration generated in response to the vibration signal by the vibration module 157 may gradually increase. Thus, the user may easily identify an increase in the sound volume of the video file 'Movie 001' with his or her sense of touch based on the intensity of the vibration generated by the vibration module 157.

Referring to FIGS. 19(*b*) and 19(*c*), text messages 236 and 237 indicating the sound volume of the video file 'Movie 001' may be displayed while the user touches the progress bar 218. The controller 180 may change the color of the text messages 236 and 237 may change according to the intensity of the vibration generated by the vibration module 157. More specifically, referring to FIG. 19(*b*), the controller 180 may turn the text message 236 green if the intensity of the vibration generated by the vibration module 157 is low. On the other hand, referring to FIG. 19(*b*), the controller 180 may turn the text message 237 red if the intensity of the vibration generated by the vibration module 157 is high. Therefore, the user may easily identify the vibration generated by the vibration module 157 not only with his or her sense of touch but also with his or her sense of sight.

Referring to FIGS. 20 and 21, vibration may be represented by the color of an object displayed in the display region 151*a*. Examples of the object include an icon, a menu window, a character-input window, a character-input key, a character-display window, and a cursor displayed in the character-display window.

More specifically, referring to FIG. 20, if a downward-direction key 239 is touched for more than a predetermined amount of time, the controller 180 may generate a vibration signal for generating vibration that moves downward. Then, the user may identify whether the key 239 is being touched with his or her sense of touch based on the vibration generated by the vibration module 157.

The controller 180 may also generate a vibration signal for increasing the intensity of the vibration generated by the vibration module 157. In addition, the controller 180 may turn the key 239 from green to red in order to visually represent the intensity of the vibration generated by the vibration module 157. Therefore, the user may instantly identify the intensity of the vibration generated by the vibration module 157 based on the color of the key 239.

Alternatively, the controller 180 may change the sharpness or color of the key 239 according to at least one of the pattern, place of occurrence, moving direction and moving speed of the vibration generated by the vibration module 157.

Referring to FIG. 21, if the user touches a character-input key 229a of a keypad 229 for more than a predetermined amount of time, the controller 180 may generate a vibration signal for generating vibration whose intensity corresponds to the duration for which, or the pressure with which the character-input key 229a is touched. As the duration for which, or the pressure with which the character-input key 229a is touched increases, the intensity of vibration generated in response to the vibration signal by the vibration module 157 may gradually increase.

The controller 180 may represent the intensity of the vibration generated by the vibration module 157 using the color of the character-input key 229a or the color of outlines 230a of the character-display window 230. More specifically, referring to FIG. 21(a), if the intensity of the vibration generated by the vibration module 157 is low, the controller 180 may turn the character-input window 229 or the outlines 230a of the character-display window 230 green. On the other hand, referring to FIG. 21(b), if the intensity of the vibration generated by the vibration module 157 is high, the controller 180 may turn the character-input window 229 or the outlines 230a of the character-display window 230 red. Therefore, the user may visually identify the intensity of the vibration generated by the vibration module 157 based on the color of the character-input window 229 or the color of the outlines 230a of the character-display window 230.

Alternatively, not only the intensity but also the pattern or frequency of the vibration generated by the vibration module 157 may correspond to the duration for which, or the pressure with which the character-input key 229a is touched. In this case, the controller 180 may change the color of the character-input window 229 or the color of the outlines 230a of the character-display window 230 according to the pattern or frequency of the vibration generated by the vibration module 157.

Still alternatively, the controller 180 may change at least one of the color of a character, the color of an object and the outline color of the object according to the vibration generated by the vibration module 157.

Referring to FIG. 22(a), if a menu icon 240 displayed in the display region 151a is touched for more than a predetermined amount of time, a menu window 241 corresponding to the menu icon 240 may be pulled out from the right side of the display region 151a. The controller 180 may generate a vibration signal for generating vibration corresponding to the duration for which, or the pressure with which the menu icon 240 is touched. Therefore, the user may identify whether the menu window 241 is being pulled out based on vibration generated in response to the vibration signal by the vibration module 157.

At least one of the pattern, place of occurrence, moving direction and moving speed of the vibration generated by the vibration module 157 may correspond to the duration for which, or the pressure with which the menu icon 240 is touched. Thus, the user may visually identify the vibration generated by the vibration module 157 based on the direction in which, and the speed at which the menu window 241 is pulled out and the sharpness, color and shape of the menu window 241. The direction in which the menu window 241 is pulled out may be the same as the moving direction of the vibration generated by the vibration module 157. In addition, the speed at which the menu window 241 is pulled out may be the same as the moving speed of the vibration generated by the vibration module 157.

Therefore, the user may visually identify the vibration generated by the vibration module 157.

Figure 23:
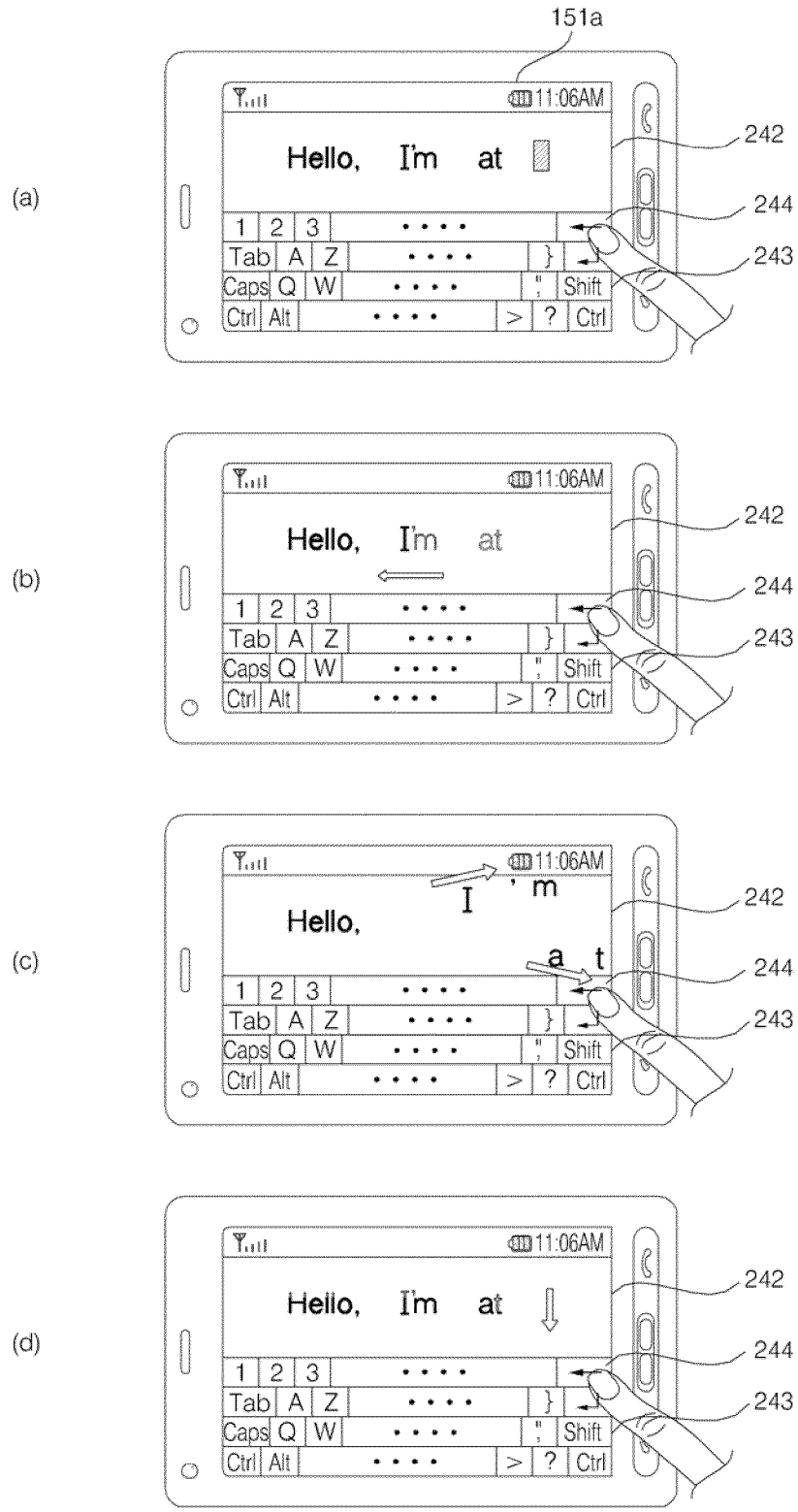

Referring to FIG. 23, the controller 180 may display a keyboard 243, which is a type of character-input window for inputting various characters, and a character-display window 242 for displaying a number of characters input with the use of the keyboard 243.

A character-input window may be implemented as a keypad or a group of command-input keys, other than a keyboard. The user may input various characters to the mobile terminal 100 by using the keyboard 243.

More specifically, referring to FIG. 23(a), if the user touches a 'backspace' key 244 of the keyboard 243 for more than a predetermined amount of time, the controller 180 may sequentially delete a number of characters displayed in the character-display window 242.

During the deletion of the characters displayed in the character-display window 242, the controller 180 may generate a vibration signal for generating vibration whose pattern, place of occurrence, moving direction and/or moving speed correspond(s) to the duration for which, or the pressure with which the 'backspace' key 244 is touched.

As the duration for which, or the pressure with which the 'backspace' key 244 is touched increases, the intensity of vibration generated in response to the vibration signal by the vibration module 157 may gradually increase.

In addition, the controller 180 may change at least one of the direction in which, the speed at which, and the manner in which the characters displayed in the character-display window 242 are deleted in order to visually represent the vibration generated by the vibration module 157.

For example, referring to FIG. 23(b), the characters displayed in the character-display window may be sequentially deleted from right to left in accordance with the moving direction of the vibration generated by the vibration module 157.

Alternatively, referring to FIG. 23(c), the characters displayed in the character-display window may be sequentially deleted, disappearing one by one from the character-display window 244.

Still alternatively, referring to FIG. 23(d), the characters displayed in the character-display window may be gradually deleted from top to bottom in accordance with the moving direction of the vibration generated by the vibration module 157.

In short, the controller 180 may change at least one of the direction in which, the speed at which, and the manner in which the characters displayed in the character-display window 242 are sequentially deleted in order to visually represent the vibration generated by the vibration module 157. Therefore, the user may visually identify the vibration generated by the vibration module 157.

Figure 24:
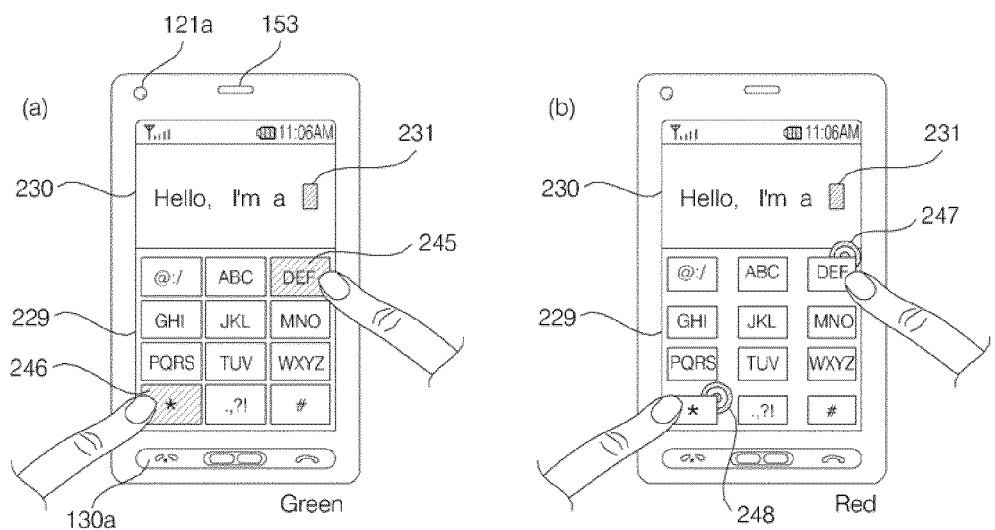
Figure 25:
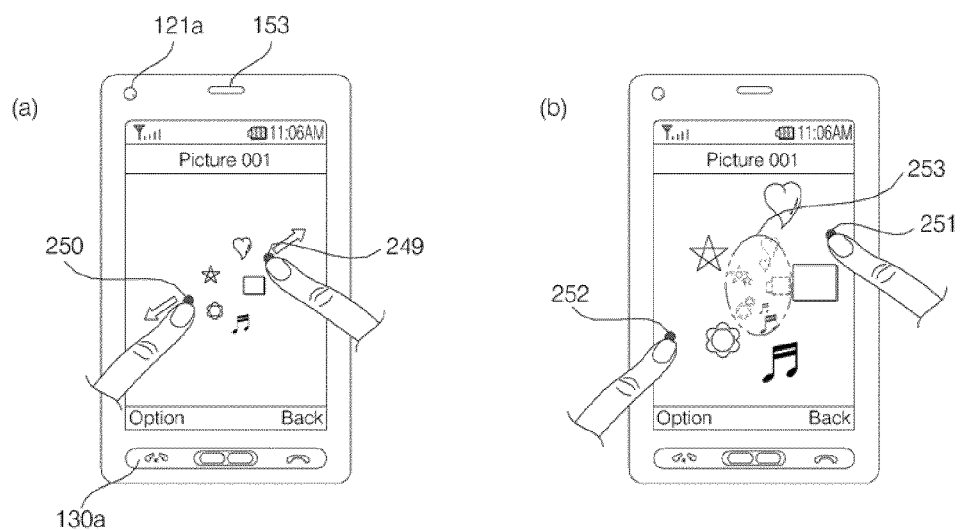

Referring to FIGS. 24 and 25, the user may make at least two selections from the display region 151a by touching as many places in the display region 151a. In this case, the controller 180 may generate a vibration signal for generating vibration whose pattern, place of occurrence, moving direction and/or moving speed correspond(s) to the number of selections made from the display region 151*a* or the distance between the selections.

In addition, the controller 180 may display a vibration-indicator image whose shape, color, moving direction and/or moving speed correspond(s) to vibration generated in response to the vibration signal by the vibration module 157. Then, the user may visually identify the vibration generated by the vibration module 157 based on the vibration-indicator image.

More specifically, referring to FIG. 24, the controller 180 may display a keypad 229, which is a type of character-input window for inputting various characters, and a character-display window 230 for displaying a number of characters input with the use of the keypad 229.

Referring to FIG. 24(*a*), the user may touch two or more character-input keys of the keypad 229, e.g., character-input keys 245 and 246, at the same time. The controller 180 may generate a vibration signal for generating vibration whose intensity increases in proportion to the number of character-input keys touched in a row within a predetermined amount of time.

In addition, referring to FIG. 24(*b*), the controller 180 may turn the character-input keys 245 and 246 or a cursor 231 in the character-display window 230 from green to red in order to represent the intensity of vibration generated in response to the vibration signal by the vibration module 157. Therefore, the user may visually identify the intensity of the vibration generated by the vibration module 157 based on the color of the character-input keys 245 and 246 or the color of the cursor 231.

Moreover, referring to FIG. 24(*b*), the controller 180 may display circular images 247 and 248 near the character-input keys 245 and 246, respectively, as vibration-indicator images. The radius or color of the circular images 247 and 248 may vary according to the intensity of the vibration generated by the vibration module 157. Thus, the user may visually identify the intensity of the vibration generated by the vibration module 157 based on the radius or color of the circular images 247 and 248.

Alternatively, if the character-input keys 245 and 246 are sequentially touched at a predetermined time interval, the controller 180 may generate a vibration signal for generating vibration that moves from the character-input key 245 to the character-input key 246. In this case, the controller 180 may change at least one of the sharpness, color, shape, moving direction and moving speed of the character-input keys or the circular images 247 and 248 according to the vibration generated by the vibration module 157.

Referring to FIG. 25, if a content item 'Picture 001' is displayed in the entire display region 151 *a* and the user makes at least two selections from the content item 'Picture 001' by touching the display region 151 *a* with his or her fingers and then drags the selections toward different directions, the content item 'Picture 001' may be enlarged or reduced.

In this case, the vibration module 157 may generate vibration whose moving direction, moving speed, pattern and/or place of occurrence correspond(s) to the number of selections made from the content item 'Picture 001' in response to a multi-touch input and the direction in which, the amount by which, and the speed at which the user drags the selections. For example, referring to FIGS. 25(*a*) and 25(*b*), if the user makes two selections 249 and 250 by touching the display region 151*a* with his or her fingers and drags the selections 249 and 250 toward points 251 and 252, respectively, the controller 180 may generate a vibration signal for generating vibration whose moving direction corresponds to a direction to zoom in on the content item 'Picture 001.'

The intensity or moving speed of vibration generated in response to the vibration signal by the vibration module 157 may correspond to the number of places on the display module 151 being touched, the speed or direction of dragging, or the duration for which, or the pressure with which the display module 151 is touched.

Referring to FIG. 25(*b*), the controller 180 may apply an afterimage effect to each of a plurality of objects included in the content item 'Picture 001' so that a trail 253 of afterimages can be left behind each of the objects as a corresponding object moves. For example, as the moving speed of the vibration generated by the vibration module 157 increases, the moving speed represented by the afterimage trails 253 of the objects may gradually increase.

Therefore, the user may visually identify the vibration generated by the vibration module 157.

Figure 26:
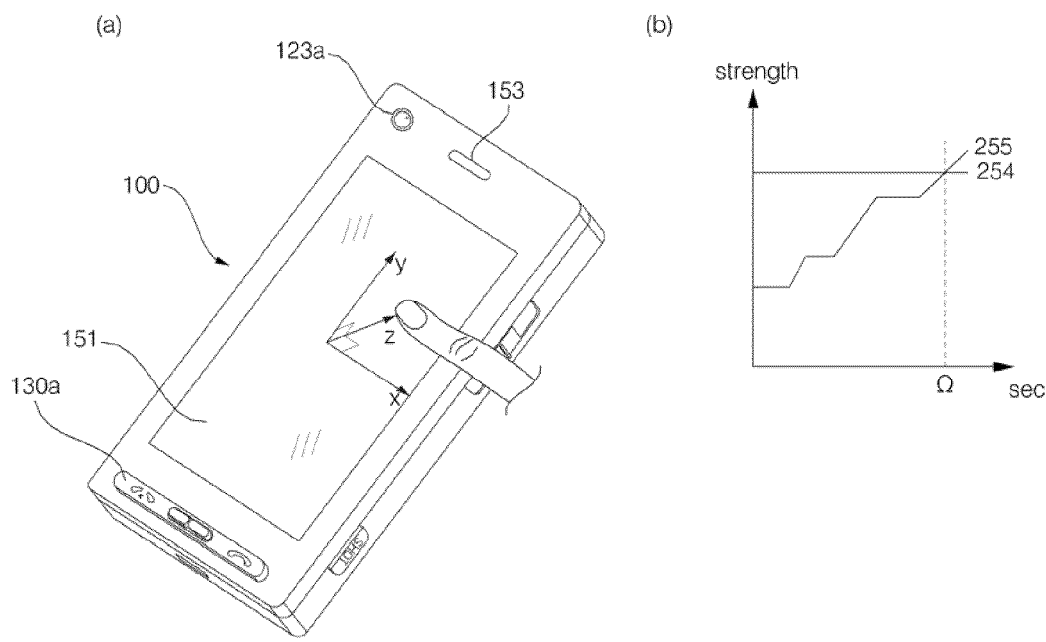
Figure 27:
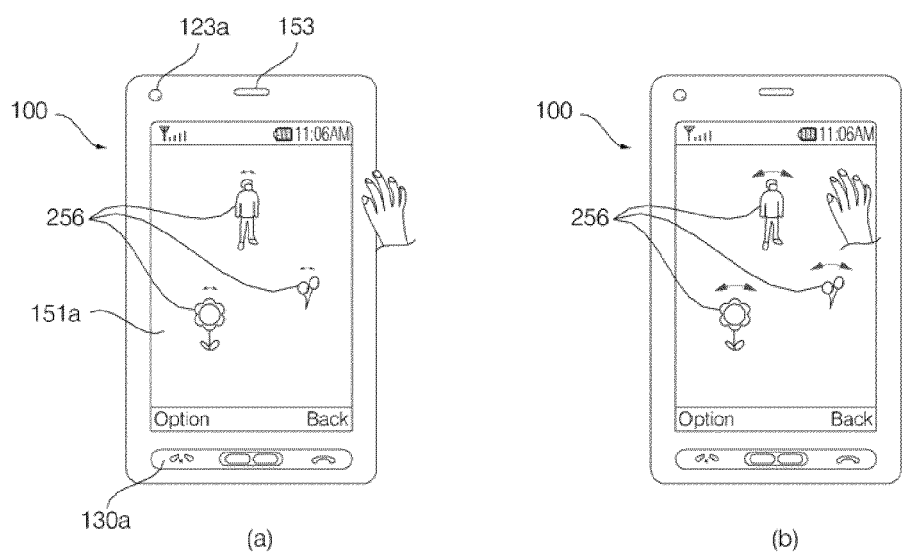

FIGS. 26 and 27 illustrate diagrams of screens for explaining how to generate a vibration signal for generating vibration whose pattern, place of occurrence, moving direction and/or moving speed correspond(s) to at least one of the distance between the display module 151 and an entity detected to be near and approaching the display module 151 by the proximity sensor 141, and the moving direction and moving speed of the detected entity and how to visualize the generated vibration.

Referring to FIG. 26(*a*), when the display module 151 is being approached by the user's finger, the proximity sensor 141, which is installed in a first body of the mobile terminal 100, may detect the user's finger and may then output a proximity signal. The proximity signal output by the proximity sensor 141 may vary according to a distance z between the display module 151 and the user's finger. For this, a plurality of proximity sensor 141 with different detection ranges may be provided. In this case, the distance z between the display module 151 and the user's finger may be determined by comparing a plurality of proximity signals respectively output by the plurality of proximity sensors 141. In addition, it may be determined what part of the display module 151 is being approached by the user's finger and whether the user's finger is being moved within the close vicinity of the display module 15 by determining which of the plurality of proximity sensors 141 is outputting a proximity signal. Then, the controller 180 may control a vibration signal for generating vibration corresponding to a touch key currently being approached by the user's finger.

FIG. 26(*b*) illustrates a graph of the variation, over time, of a sum 255 of the intensities of vibrations generated while the user's finger is approaching the display module 151 or stays in the close vicinity of the display module 151. Referring to FIG. 26(*b*), if the vibration intensity sum 255 exceeds a threshold value 254, the controller 180 may stop detecting any touch input from the display module 151.

FIG. 27 illustrates diagrams of screens for explaining how to change at least one of the sharpness, color, shape, pattern of vibration and frequency of vibration of a plurality of objects 256 according to at least one of the distance between the display module 151 and an entity detected to be near and approaching the display module 151 by the proximity sensor 141, and the moving direction and moving speed of the detected entity. Referring to FIGS. 27(*a*) and 27(*b*), if there is an entity detected to be near and approaching the display module 151, the controller 180 may generate a vibration signal for generating vibration whose pattern, place of occurrence, moving direction and/or moving speed correspond(s) to the distance between the display module 151 and the detected entity, and the moving direction and moving speed of the detected entity. In addition, the controller 180 may display the objects 256 on the display module 151. At least one of the sharpness, color, shape, pattern of vibration and frequency of vibration of the objects 256 may correspond to at least one of the pattern, place of occurrence, moving direction and moving speed of vibration generated in response to the vibration signal by the vibration module 157.

As the distance between the display module 151 and the detected entity decreases, the intensity of the vibration generated by the vibration module 157 may gradually increase. As the intensity of the vibration generated by the vibration module 157 increases, the degree to which the objects 256 vibrate may gradually increase. That is, the objects 256 vibrate more when the user's finger is close to the display module 151 than when the user's finger is distant from the display module 151.

Therefore, the user may easily identify the vibration generated by the vibration module 157 not only with his or her sense of touch but also with his or her sense of sight. The objects 256 are illustrated in FIG. 27 as being avatars, but the present invention is not restricted to this. That is, various types of icons may be used as the objects 256.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

According to the present invention, it is possible to visualize the pattern, place of occurrence, moving direction and/or moving speed of vibration generated in response to a vibration signal and thus to help a user identify the generated vibration not only with his or her sense of touch but also with his or her sense of sight.

In addition, according to the present invention, it is possible to display a vibration-indicator image representing vibration generated in response to the detection of an entity near and approaching a mobile terminal and change the vibration-indicator image according to the mobile terminal and the entity. Thus, it is possible for a user to easily determine the state of the entity based on the vibration-indicator image.

Moreover, according to the present invention, if a mobile terminal is placed in a manner mode and thus cannot generate vibration, it is possible to display a vibration-indicator image and thus to help a user identify vibration that may have been generated otherwise. Thus, it is possible to easily determine the operating state of the mobile terminal and control the operation of the mobile terminal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal comprising a vibration module configured to generate vibration and a touch screen configured to receive a touch input and display information, the method comprising:
   generating a vibration signal for controlling the vibration module in response to the touch input, the touch input having a touch pattern comprising at least a touch region and a touch duration;
   outputting vibration corresponding to the vibration signal via the vibration module;
   displaying a predetermined image at a location on the touch screen where the touch input is detected while outputting the vibration, the displayed predetermined image comprising a visual representation corresponding to the output vibration;
   changing a shape of the displayed predetermined image in response to a change of the touch duration; and
   moving the displayed predetermined image on the touch screen in response to a change of the touch region.

2. The method of claim 1, further comprising:
   changing a screen displayed on the touch screen according to at least an intensity, a pattern, a place of occurrence, a direction of movement or a speed of movement of the output vibration.

3. The method of claim 2, wherein changing the screen comprises changing at least a color, a color of outlines, a sharpness, a shape, or a location of the displayed predetermined image.

4. The method of claim 1, wherein the predetermined image is a circular image comprising at least a circular line.

5. The method of claim 4, further comprising:
   changing at least an intensity or a pattern of the generated vibration according to the touch duration of the detected touch input; and
   changing a shape of the displayed circular image according to the touch duration of the detected touch input.

6. The method of claim 4, further comprising:
   changing at least an intensity or a pattern of the generated vibration according to a change of the touch region of the detected touch input; and
   changing a shape of the displayed circular image according to the change of the touch region.

7. The method of claim 1, wherein:
   the displayed predetermined image is a wave image comprising at least one wavy line; and
   the at least one wavy line corresponds to the touch duration.

8. The method of claim 1, further comprising:
   no longer displaying the predetermined image on the touch screen when the touch input is no longer detected.

9. The method of claim 1, further comprising:
   changing at least an intensity, a pattern, a place of occurrence, a direction of movement or a speed of movement of the output vibration according to the touch pattern of the detected touch input.

10. The method of claim 1, wherein:
    the displayed shape of the predetermined image comprises a circle; and
    changing the displayed shape of the predetermined image occurs when the touch input is received on the touch screen at an area that is proximate to a location where the predetermined image is displayed.

11. The method of claim 1, wherein a duration of the output vibration corresponds to the touch duration of the detected touch input.

12. The method of claim 1, wherein the predetermined image indicates an image acquired by visualizing a vibration to be generated in response to the vibration signal.

13. The method of claim 2, wherein changing the screen comprises changing an item displayed on the touch screen when the touch input is detected at an area on the displayed screen that is near the displayed item.

14. The method of claim 2, wherein the at least intensity, pattern, place of occurrence, direction of movement, or speed of movement of the output vibration corresponds to at least a direction of change of the touch region, a speed of change of the touch region, or a duration of a touch applied to the touch screen.

15. The method of claim 2, wherein:
the detected touch input comprises a touch-and-drag input of one of a plurality of objects displayed on the screen; and
the plurality of objects comprise at least a progress bar, an icon, a content item, or a cursor.

16. The method of claim 15, wherein changing the screen comprises:
applying an afterimage effect to the detected touch-and-drag input such that a trail of afterimages remains behind the one of the plurality of objects when the one of the plurality of objects is moved; and
changing at least a sharpness, a color, a shape a direction of movement, or a speed of movement of the trail of afterimages.

17. The method of claim 2, further comprising:
displaying a menu icon on the touch screen; and
displaying a menu screen corresponding to the displayed menu icon such that the menu screen appears to be pulled out from one side of the touch screen when a touch input to the displayed menu icon is detected,
wherein the generated vibration corresponds to at least a direction in which the menu screen is pulled, a speed at which the menu screen is pulled, a sharpness of the menu screen, a color of the menu screen, or a shape of the menu screen.

18. The method of claim 2, further comprising:
displaying a character-editing screen configured to at least receive input characters, edit the input characters, or display the input characters, wherein:
the displayed character-editing screen comprises a 'backspace' key configured to delete one or more characters displayed on the character-editing screen when a touch input to the 'backspace' key is detected for more than a predetermined amount of time; and
the generated vibration corresponds to at least a direction, a speed, or a manner in which the displayed one or more characters are deleted.

19. The method of claim 2, wherein the at least intensity, pattern, place of occurrence, direction of movement or speed of movement of the generated vibration corresponds to at least a number of displayed items from the screen, or a distance between two or more selections from the displayed screen.

20. The method of claim 2, further comprising:
obtaining information related to a distance between the touch screen and a near-and-approaching entity detected via a proximity sensor, a direction of movement of the detected near-and-approaching entity, or a moving speed of the detected near-and-approaching entity,
wherein the at least intensity, pattern, place of occurrence, direction of movement or speed of movement of the generated vibration corresponds to at least the distance between the touch screen and the detected near-and-approaching entity, the direction of movement of the detected near-and-approaching entity, or the speed of movement of the detected near-and-approaching entity.

21. The method of claim 20, further comprising no longer detecting the touch input when the intensity of the output vibration exceeds a threshold level.

22. A mobile terminal comprising:
a vibration module configured to generate vibration;
a touch screen configured to receive a touch input and display information; and
a controller configured to:
detect a touch input received via the touch screen, the touch input having a touch pattern comprising at least a touch region and a touch duration;
generate a vibration signal for controlling the vibration module to generate vibration in response to the detected touch input;
cause the vibration module to output the generated vibration;
cause displaying of a predetermined image at a location on the touch screen where the touch input is detected while the vibration is output, the displayed predetermined image comprising a visual representation corresponding to the output vibration;
cause the touch screen to change a shape of the displayed predetermined image according to a change of the touch duration; and
cause the touch screen to move the displayed predetermined image according to a change of the touch region.

23. The mobile terminal of claim 22, wherein the controller is further configured to cause changing of a screen displayed on the touch screen according to at least an intensity, a pattern, a place of occurrence, a direction of movement or a speed of movement of the output vibration.

24. The mobile terminal of claim 23, wherein the controller is further configured to cause the touch screen to change at least a color, a color of outlines, a sharpness, a shape, or a location of the displayed predetermined image.

25. The mobile terminal of claim 23, wherein:
the at least intensity, pattern, place of occurrence, direction of movement or speed of movement of the generated vibration corresponds to at least a direction of change of the touch region, a speed of change of the touch region, or a duration of a touch input applied to the touch screen.

26. The mobile terminal of claim 22, wherein the predetermined image is a circular image comprising at least a circular line.

27. The mobile terminal of claim 26, wherein the controller is further configured to:
cause the vibration module to change at least an intensity or a pattern of the generated vibration according to the touch duration of the detected touch input; and
cause the touch screen to change a shape of the displayed circular image according to the touch duration of the detected touch input.

28. The mobile terminal of claim 26, wherein the controller is further configured to:

cause the vibration module to change at least an intensity or a pattern of the generated vibration according to a change of the touch region of the detected touch input; and cause the touch screen to change a shape of the displayed circular image according to the change of the touch region.

29. The mobile terminal of claim 22, wherein:
the displayed predetermined image is a wave image comprising at least one wavy line; and
the at least one wavy line corresponds to the touch duration.

30. The mobile terminal of claim 22, wherein the controller is further configured to control the touch screen to no longer display the predetermined image when the touch input is no longer detected.

31. The mobile terminal of claim 22, wherein the controller is further configured to control the vibration module to change at least an intensity, a pattern, a place of occurrence, a direction of movement or a speed of movement of the output vibration according to the touch pattern of the detected touch input.

32. The mobile terminal of claim 22, wherein:
the displayed shape of the predetermined image comprises a circle; and
the controller is further configured to control the touch screen to change the displayed shape of the predetermined image when the touch input is received on the touch screen at an area that is proximate to a location where the predetermined image is displayed.

33. The mobile terminal of claim 22, wherein a duration of the output vibration corresponds to the touch duration of the detected touch input.

34. The mobile terminal of claim 22, wherein the predetermined image indicates an image acquired by visualizing a vibration to be generated in response to the vibration signal.

* * * * *